United States Patent [19]

Kuznetsov

[11] Patent Number: 5,642,249
[45] Date of Patent: Jun. 24, 1997

[54] METHOD AND APPARATUS FOR LIMITING HIGH CURRENT ELECTRICAL FAULTS IN DISTRIBUTION NETWORKS BY USE OF SUPERCONDUCTING EXCITATION IN TRANSVERSE FLUX MAGNETIC CIRCUIT

[76] Inventor: Stephen B. Kuznetsov, 1 Thomas La., Pittsburgh, Pa. 15235

[21] Appl. No.: 579,929

[22] Filed: Dec. 28, 1995

Related U.S. Application Data

[63] Continuation-in-part of Ser. No. 163,434, Dec. 8, 1993, abandoned.

[51] Int. Cl.$^6$ ..................................... H02H 9/00
[52] U.S. Cl. ..................... 361/58; 361/19; 361/141; 336/30
[58] Field of Search .................. 361/58, 19, 141; 307/414, 415; 336/30, 40, 131, 132, 134, 145, 146, 147, DIG. 1

[56] References Cited

U.S. PATENT DOCUMENTS

| | | | |
|---|---|---|---|
| 5,241,447 | 8/1993 | Barber et al. | 361/141 |
| 5,355,275 | 10/1994 | Goodier et al. | 361/141 |

*Primary Examiner*—Jeffrey A. Gaffin
*Assistant Examiner*—Michael J. Sherry
*Attorney, Agent, or Firm*—Ansel M. Schwartz

[57] ABSTRACT

The present invention pertains to an electrical fault limiter. The fault limiter comprises a first magnetic core. There is also a second magnetic core opposing the first magnetic core. The fault limiter additionally comprises a third magnetic core adjacent the first magnetic core. Also, there is a fourth magnetic core opposing the third magnetic core and adjacent the second magnetic core. The electrical fault limiter also moreover comprises a rotor disposed between the first and second magnetic cores, and the third and fourth magnetic cores. The rotor is rotatable about a rotor axis. The first and second magnetic cores are disposed on a first side of the rotor axis and the third and fourth magnetic cores are disposed on a second side of the rotor axis. Each core has a first arm, a second arm and a body to which the first and second arms are connected. Each body has a superconducting bias coil disposed about it. Each arm has a conduction mode coil disposed about it. The rotor has a high magnetic reluctance sector and a return flux sector such that when the magnetomotive force from each superconducting bias coil balances with the magnetomotive force from associated load coils on an associated core, there is no force on the rotor. But, when the magnetomotive force from the superconducting bias coil is less than the magnetomotive force from associated load coils on the associated core, then a force is produced on the rotor causing it to accelerate and the reluctance of the primary magnetic circuit is decreased, thereby causing an increase in the self-inductance of the primary coil.

27 Claims, 24 Drawing Sheets

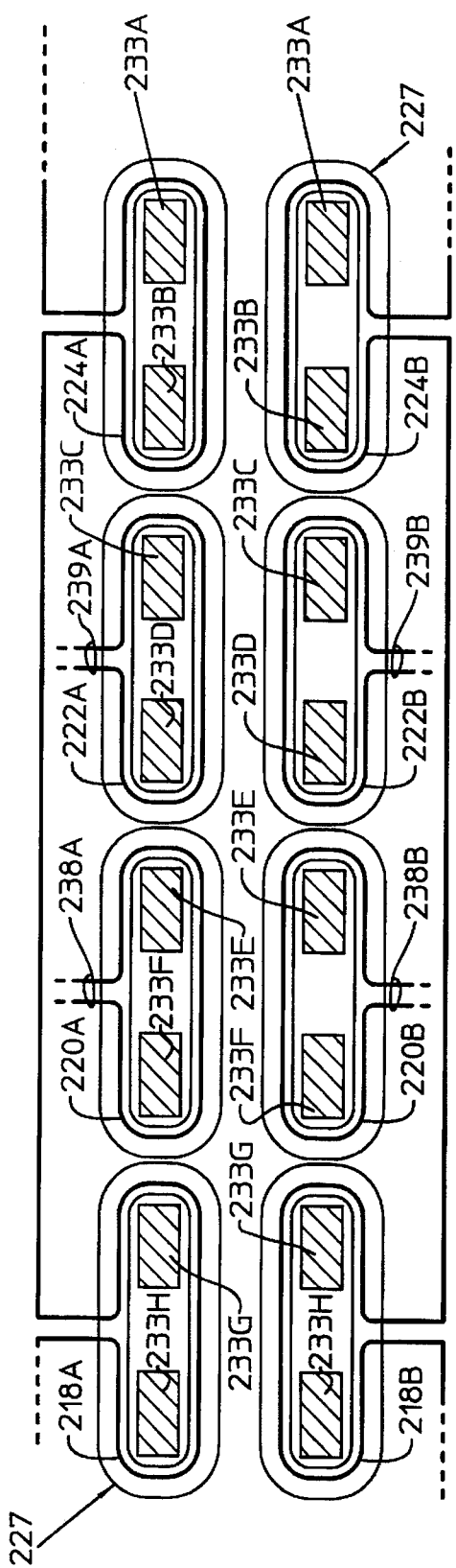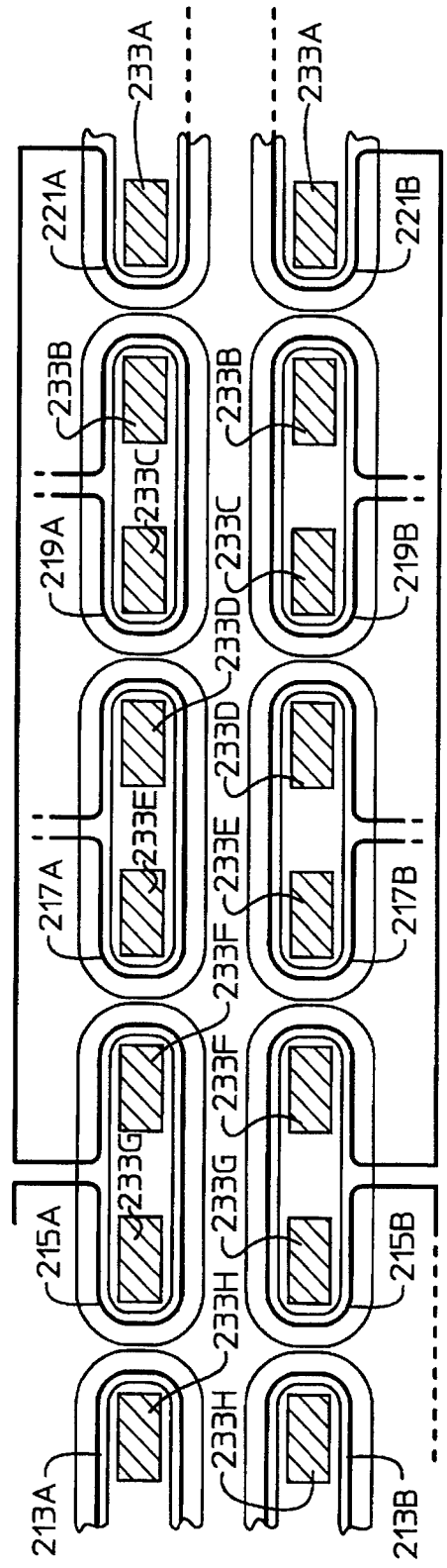
FIG 22A
FIG 22B

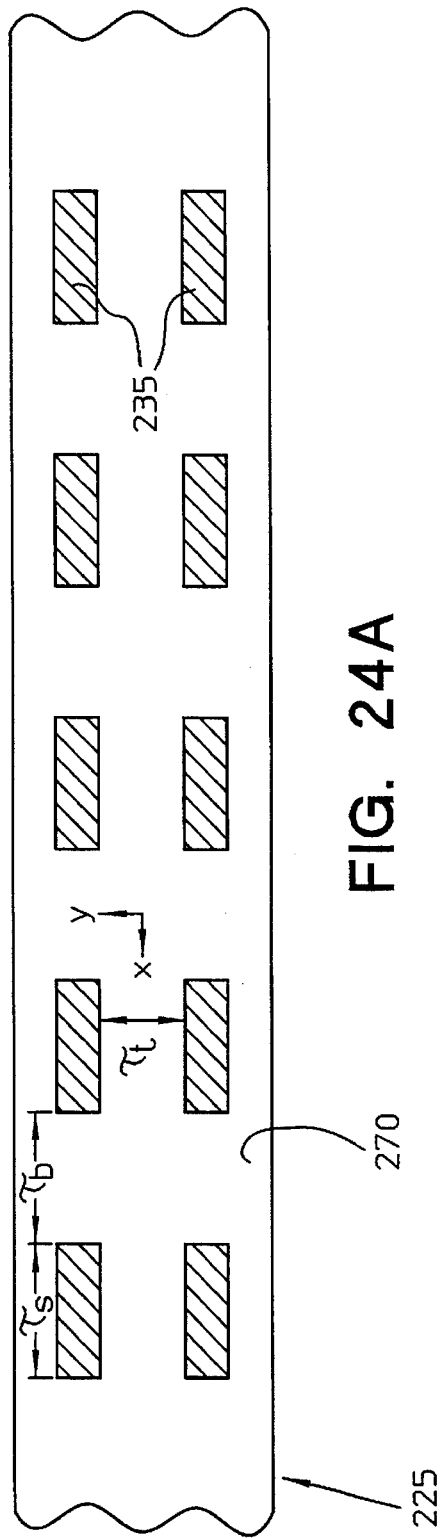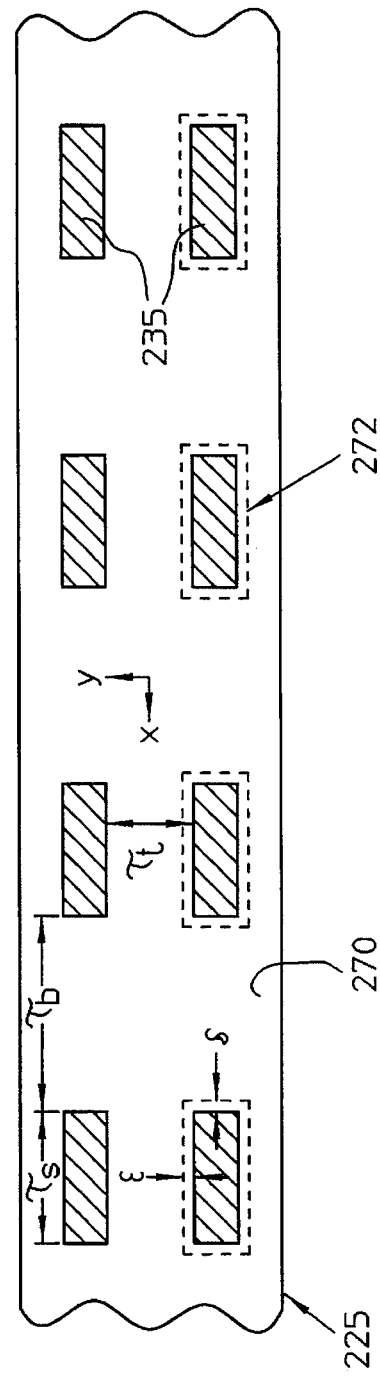

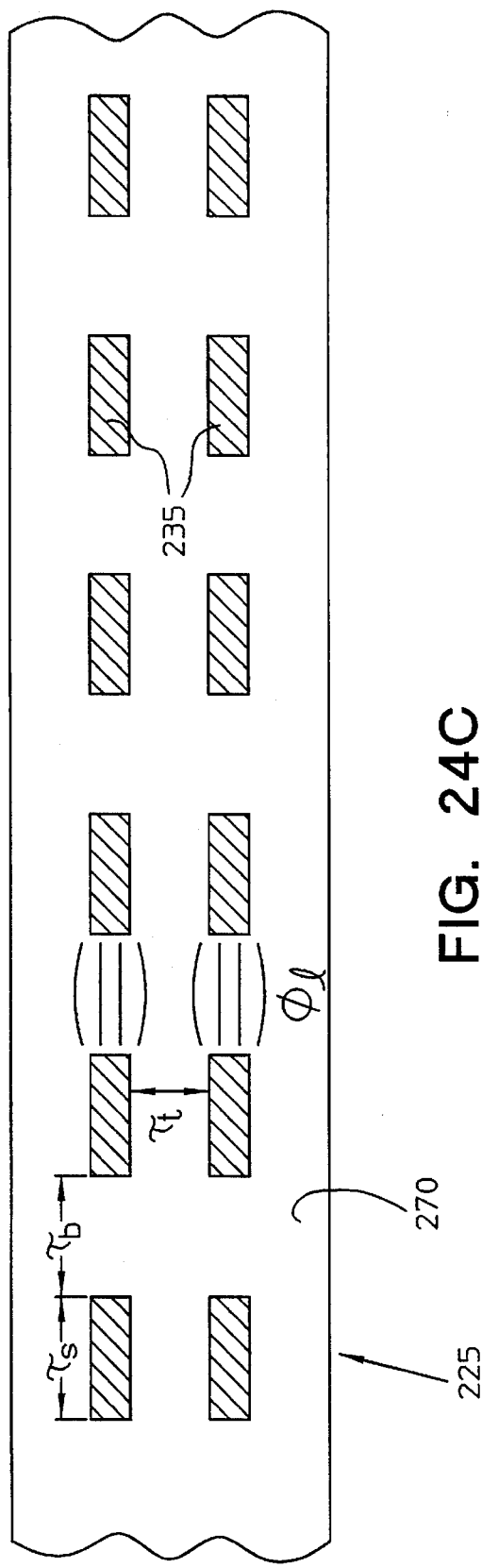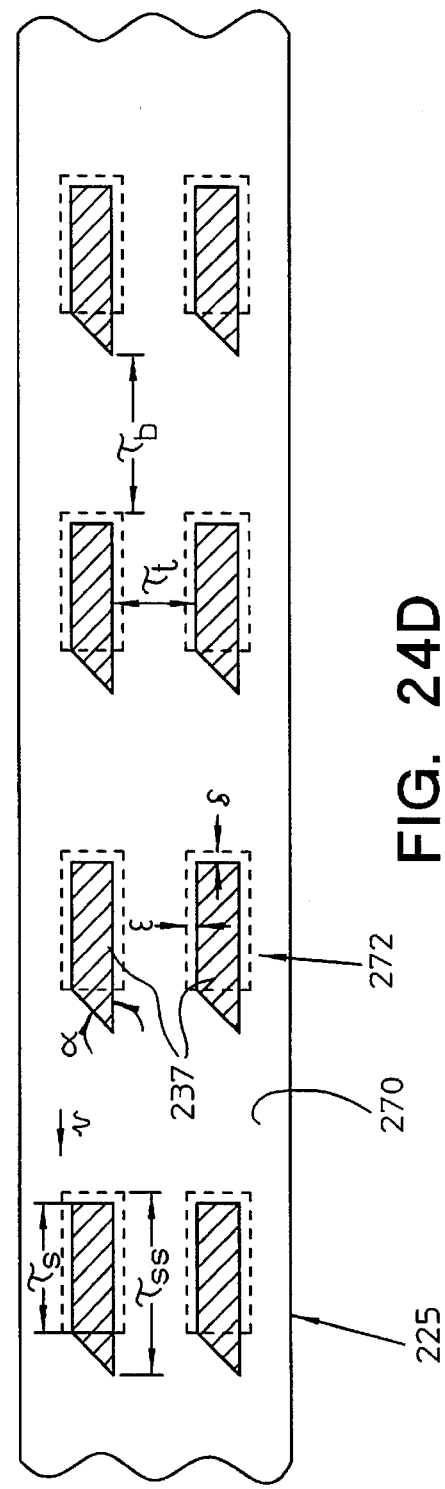
FIG. 24C
FIG. 24D

METHOD AND APPARATUS FOR LIMITING HIGH CURRENT ELECTRICAL FAULTS IN DISTRIBUTION NETWORKS BY USE OF SUPERCONDUCTING EXCITATION IN TRANSVERSE FLUX MAGNETIC CIRCUIT

This application is a continuation-in-part of application Ser. No. 08/163,434 filed on Dec. 8, 1993 now abandoned.

FIELD OF THE INVENTION

The present invention pertains to an electrical fault limiter for application to high voltage power distribution networks. More specifically, the present invention pertains to a high current electrical fault limiter that uses superconducting high-field magnet excitation to reduce size and provide serial performance characteristics for speed of response.

BACKGROUND OF THE INVENTION

The prior art in superconductive fault limiters addresses either resistive insertion (R.I.) or inductive insertion (I.I.) into the subject power line with the prior art using devices which are static and rely upon a change in the state of the superconductor from being a zero resistance to a finite resistance component. These systems have a limitation on the maximum current handling capability of the device usually determined by the quench characteristics or maximum allowable AC field imparted upon the superconductor. The response time of these prior-art systems are large and typically exceed one cycle on a 60 Hz waveform or 16.6 ms which reduces the effectiveness of these systems in limiting large power faults.

SUMMARY OF THE INVENTION

The present invention pertains to an electrical fault limiter. The fault limiter comprises a first magnetic core. There is also a second magnetic core opposing the first magnetic core. The fault limiter additionally comprises a third magnetic core adjacent the first magnetic core. Also, there is a fourth magnetic core opposing the third magnetic core and adjacent the second magnetic core. The electrical fault limiter also moreover comprises a rotor disposed between the first and second magnetic cores, and the third and fourth magnetic cores. The rotor is rotatable about a rotor axis. The first and second magnetic cores are disposed on a first side of the rotor axis and the third and fourth magnetic cores are disposed on a second side of the rotor axis. Each core has a first arm, a second arm and a body to which the first and second arms are connected. Each body has a superconduction bias coil disposed about it. Each arm has a conduction mode coil disposed about it. The rotor has a high magnetic reluctance sector and a return flux sector such that when the magnetomotive force from each superconduction bias coil balances with the magnetomotive force from associated load coils on an associated core, there is no force on the rotor. But, when the magnetomotive force from the superconduction bias coil is less than the magnetomotive force from associated load coils on the associated core, then a force is produced on the rotor causing it to accelerate.

BRIEF DESCRIPTION OF THE DRAWINGS

In the accompanying drawings, the preferred embodiment of the invention and preferred methods of practicing the invention are illustrated in which:

FIG. 22A shows a longitudinal-transverse view of a transverse-flux fault limiter tertiary coil set closest to the airgap and secondary electrical member.

FIG. 22B shows a longitudinal-transverse view of a transverse-flux fault limiter tertiary coil set closest to the bottom of the u-shaped magnetic core enclosing the tertiary flux.

FIG. 24A is a longitudinal-transverse view of the secondary electrical member with rectangular magnetic inserts for reluctance control with symmetrical spacing of magnetic inserts.

FIG. 24B is a longitudinal-transverse view of the secondary electrical member with rectangular magnetic inserts and wide spacing of magnetic inserts.

FIG. 24C is a longitudinal-transverse view of the secondary electrical member with rectangular magnetic inserts spaced apart by less than the longitudinal dimension of the magnetic insert.

FIG. 24D is a longitudinal-transverse view of the secondary electrical member with modified edges on the magnetic inserts for altering the rate of change of magnetic reluctance as a function of secondary longitudinal position in the fault limiter.

DESCRIPTION OF THE PREFERRED EMBODIMENT

Figure 1:
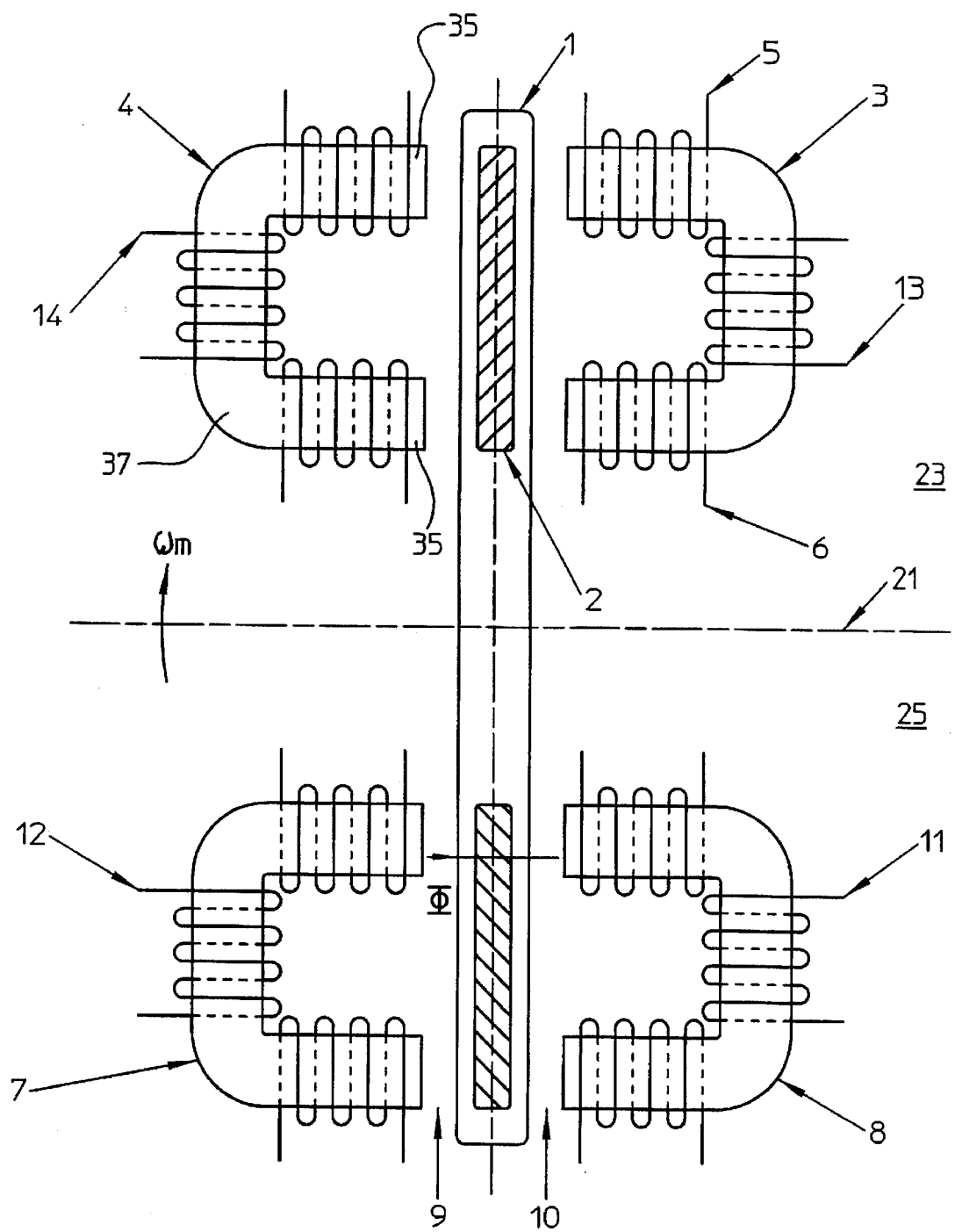
FIG. 1 is a radial-longitudinal cross-section transverse flux current limiter.
Figure 2:
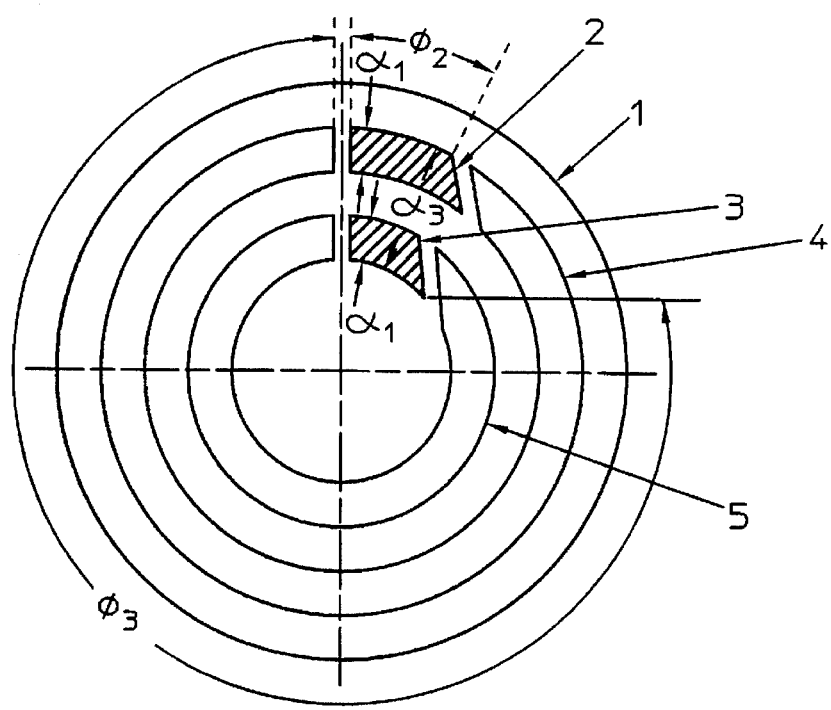
FIG. 2 is a rotor disc layout showing low and high reluctance sounds.

Referring now to the drawings wherein like reference numerals refer to similar or identical parts throughout the several views, and more specifically to FIG. 1 thereof, there is shown a radial-longitudinal cross-section of an electrical fault limiter. The fault limiter comprises a first magnetic core 4. There is a second magnetic core 3 opposing the first magnetic core 4. There is a third magnetic core 12 adjacent the first magnetic core 4. Additionally, there is a fourth magnetic core 11 opposing the third magnetic core 12 and adjacent to second magnetic core 3. There is a rotor 1 disposed between the first and second magnetic cores 4, 3; and the third and fourth magnetic cores 12, 11. The rotor 1 is rotatable about a rotor axis 21. The first and second magnetic cores 4, 3 are disposed on a first side 23 of the rotor axis 21 and the third and fourth magnetic cores 12, 11 are disposed on a second side 25 of the rotor axis 21. Each core has a first arm 33, a second arm 35 and a body 37 to which the first and second arms 33, 35 are connected. Each body 37 has a superconduction bias coil (14 on the first core 4), each arm has a conduction load coil 5, 6 disposed about it. The rotor has a high magnetic reluctance zone 2 and a return flux sector 3 as shown in FIG. 2 such that when the magnetomotive force from each superconductor bias coil balances with the magnetomotive force from associated low coils on an associated core, there is no force on the rotor 1, but when the magnetomotive force from the superconduction bias coil is less than the magnetomotive force from associated low coils on the associated core, then a force is produced on the rotor 1 causing it to accelerate. Preferably, the conduction load coils are superconduction load coils.

The described invention makes use of both high-field (4–8 Tesla) and medium field (2–4 Tesla) superconductors in a high current fault limiter without the effect of armature or load-current reaction which otherwise would eliminate the maximum current carrying ability of the present invention. The need to limit overload or fault current in high-voltage electrical distribution systems is dependent on the following 5 parameters for production of a commercially-viable device:

1. Ability to initiate principal current limiting action in a sub-cycle basis such as quarter-cycle response time (e.g. 4.15 ms on a 60 Hz waveform).

2. Ability to reset fault-limiter by electronic or solid-state means in a sub-cycle basis (e.g. 1 ms) to prepare subject device for next fault limiting action which may occur within several cycles of initial fault.

3. Ability of subject device to "hold and latch" in the fault limiting mode for extended periods of time in high impedance mode without degradation of high voltage blocking capability on a high-voltage distribution network, of typically line to line voltage 7.2 kV–38 kV.

4. Ability to change overall device impedance which is substantially inductive reactance in series insertion mode by a minimum factor of 60:1 in the above described operating period (e.g. ¼ cycle) with no substantial introduction of series or shunt resistance so as to limit or curtail all dissipative losses of the subject device.

5. The series impedance of the present invention when in the non-limiting or off-mode is to be a minimum for both series R and series $X_L$ components so that the normal steady-state losses are negligible compared to other system power losses. The off-state mode has both inductive losses calculated as $Q=I^2 X_L$ and resistive losses calculated as $P=I^2 R$. The overall off-state apparent power loss is calculated as $S=\sqrt{P^2+Q^2}$ The present invention as shown in FIG. 1 makes specific use of a rapid-change in series inductive reactance by the rotary arc movement of a low inertia disc rotor in a 360° or less arc using transverse-flux inductive coupling of the primary and secondary electrical members. The primary electrical member is a series of ferromagnetic and laminated cores or pole-pieces 3, 4, 7, and 8 to form a multipolar excitation structures arranged in either a 360° or smaller angle array surrounding the disc rotor secondary electrical member 1, 2 with identical or similar primary cores on both sides of the disc rotor secondary electrical member. Each primary core has a flux path which is transverse and crosses an airgap 9 between the core 7 and disc rotor secondary electrical member 1, said flux penetrating the entire disc and crossing the second airgap 10 to reach the opposing set of ferromagnetic cores 8 composing the remaining half of the primary member.

Primary excitation windings 5, 6 are connected to the AC bus circuit requiring fault limiting in a series injection mode. Main windings 5 and 6 may be connected in either series or parallel from the same core depending on "off-state" impedance desired, and are subject to the full electromagnetic forces developed under fault current conditions. When the current in winding 5 or 6 exceeds a threshold current $I_T$ the resulting electrodynamic action between primary member and secondary electrical member causes the secondary conductor to rotate due to the induced currents in the disc rotor and the consequent induction motor action. The disc rotor secondary electrical member 1 disc is composed of an electrically conductive material such as copper which should not be ferromagnetic and mounted on a shaft capable of transmitting torque T to a reaction bar or torsion spring to limit the arc movement to either 360° or a definite multiple of 360° rotation. The important distinction of the present invention is the exact composition of the rotor disc which is isotropic and aside from the base conducting material, each disc rotary secondary electrical member 2 has a ferromagnetic insert which eventually is moved into a spatial rotor position by induction-repulsion action causing a rapid change in reflected impedance in the primary winding coils, 5, 6. It is this change in reflected coil impedance which appears at the distribution line. The following analysis shows how a 60:1 change in steady-state inductive reactance is practical using the described geometry and a transverse flux magnetic orientation.

The uniqueness of the approach resides in the magnetic circuit which necessarily relies on transverse flux field orientation to insure that there is only positive reaction torque on the disc, i.e., during both negative and positive swings of the AC fault current cycle the disc travel is absolutely limited to move in one direction only without exception. The present invention also includes a corresponding solid-state latching mechanism to hold the disc in a fixed position for maximum magnetic reluctance once the fault has occurred. This latching mechanism preferably uses superconducting excitation and is resettable upon external command. The rapid and controllable change in overall magnetic reluctance of the device is described in terms of magnetic equivalent circuits and ferromagnetic cores of the "C" type construction arranged in a multipolar structure.

Figure 3:
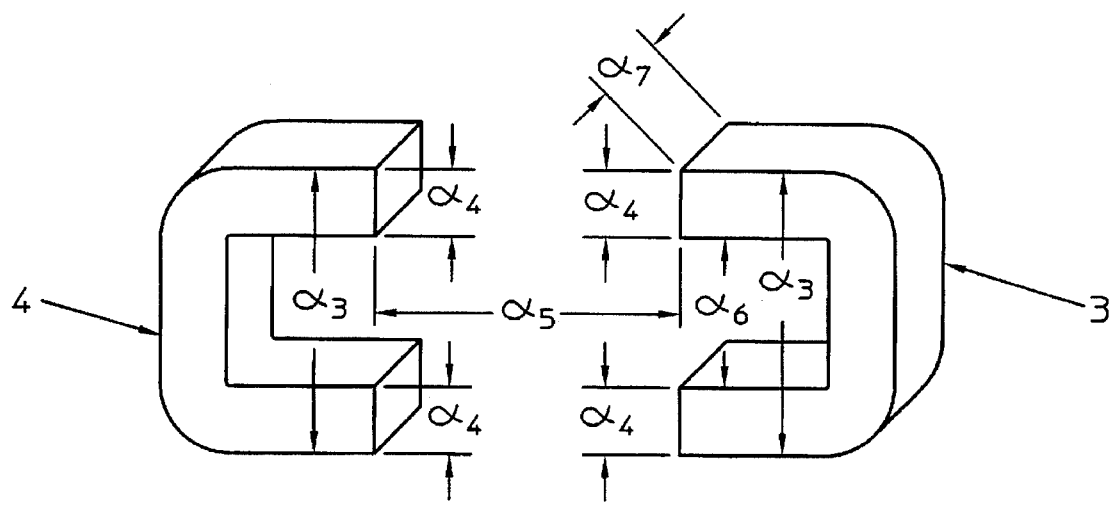
FIG. 3 is a depiction of dimensions of magnetic cores comprising a primary.

FIG. 2 shows a basic zoned-rotor disc 1 which comprises: A high magnetic reluctance sector 2 of radial dimension $\alpha_1$ forms the secondary during the off-state operation. i.e. prior to fault limiting. The reluctance sector 2 is a conducting solid medium such as copper or aluminum but non-ferromagnetic. The return flux sector 3 has dimension $\alpha_2 = \alpha_1$ or $\alpha_2 \approx \alpha_1$ as the same amount of flux has to pass through reluctance sector 2 as return flux sector 3. The dimension $\alpha_1$ or $\alpha_2$ has to approximately equal to the radial core dimension $\alpha_4$ of the primary cores, as shown in FIG. 3, for optimum use of materials. Dimension $\alpha_3$ shown in FIG. 3 is the overall radial height of the primary cores and corresponds to the dimension $\alpha_3$ shown in FIG. 2. The high reluctance sector is limited to rotor angle $\theta_1$ for the outer edge and limited to angle $\theta_2$ at the inward edge of Item 2 of FIG. 2. The other crucial parameter is the effective airgap $2 \times \alpha_5$ for the case when high magnetic reluctance sector 2 and return flux sector 3 is between the primary cores. Dimension $\alpha_5$ is chosen to be relatively large e.g. 3 cm but in general its dimension must be chosen based upon a field plot or reluctance calculation taking into account dimension $\alpha_6$, the spacing between inner edges of one primary C-core. In general, it is a design criterion that for high magnetic reluctance $$\alpha_5 > \alpha_6$$

Figure 4A:
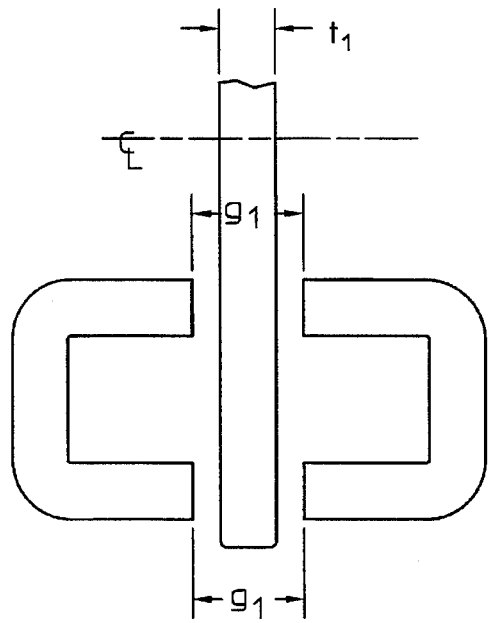
FIGS. 4a and 4b are relative differences in magnetic gap between disc sector and off-state and on-state, respectively.
Figure 4B:
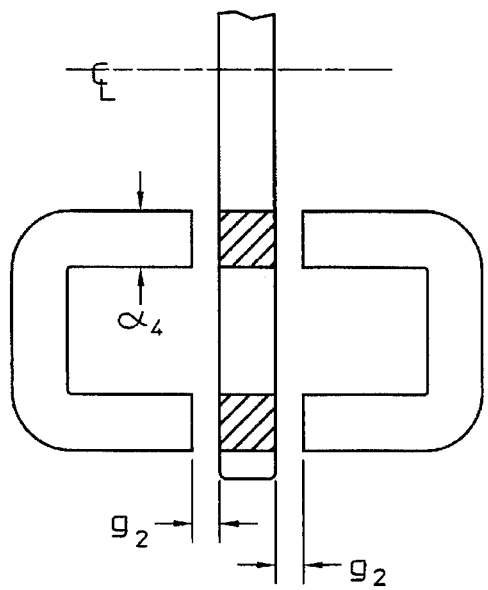
Figure 4C:
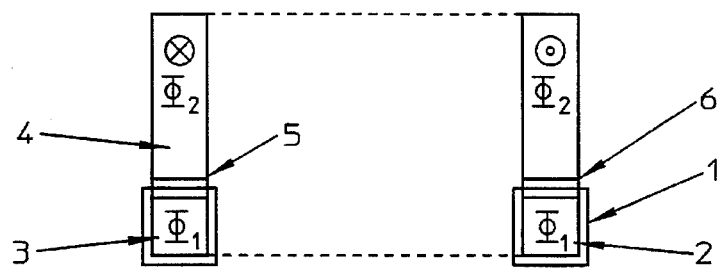
FIG. 4c is a representation of the magnetic core showing location of shading ring in each pole face to initiate traveling wave action.

In the on-state or after the rotor disc has electrodynamically moved at least sector angle $\theta_1$, the new rotor material between C-cores 3, 4 is a low reluctance material and highly ferromagnetic such as Hiperco 50 steel which has a 50% cobalt content and a high saturation density such as 2.4 Tesla. The dimensioning of the airgap with the ferromagnetic zone 3, 4 is shown in FIG. 4b. The mechanical airgap per side is $g_2$ and thus the total magnetic gap is $4g_2$. Gap $g_2$ is sized to be as small as mechanical tolerances permit with the stiffness of rotor disc taken into consideration. A typical value for this gap is $g_2 = 0.5$ mm. FIG. 4c shows the preferred mechanism for causing disc rotation with a single-phase excitation source and independent of the tertiary coil. A highly conductive closed loop (1) surrounds portion (2) of magnetic core face causing a phase shift in magnetic flux between $\Phi_1$ and $\Phi_2$ to occur, producing a traveling magnetic field sufficient to accelerate the rotor disc by induction-repulsion action. The disc accelerating force is proportional to $I^2$. The area of pole face 3 should not be equal to the area of pole face 4 but significantly smaller than pole face 4. The shading rings are preferably located as close to the airgap as possible with slots 5, 6 cut to accommodate the shaded-ring conductors.

The magnetic reluctance of the off-state (termed Mode 1) is approximately $$R_1 = \frac{l_1}{\mu_0 A} = \frac{4g_2}{\alpha_4 \cdot \alpha_7}$$

where l is the transverse gap and A is the pole face area, $\mu_o$ is the permeability of free space. In the on-state or fault limiting, the reluctance is now $$R_2 = \frac{l_2}{\mu_o A} = \frac{4g_2}{\mu_o \alpha_4 \cdot \alpha_7}$$

The ratio of the reflected inductance $L_1/L_2$ is the ratio of the inverse of the magnetic reluctances as $$\frac{L_1}{L_2} = \frac{N^2/R_1}{N^2/R_2} = \frac{R_2}{R_1}$$

where N is the total number of turns per set of C-cores per phase. If typical design values are used:

$g_1 = 6.0$ cm $g_2 = 0.5$ mm $T_1 =$ disc thickness $= 5.9$ cm

Then the reluctance ratio is $$\frac{R_1}{R_2} = \frac{2g_1}{4g_2} = \frac{12.0 \text{ cm}}{0.2 \text{ cm}} = 60:1$$

and consequently the inductive reactance ratio is $$\frac{X_{L2}}{X_{L1}} = 60$$

where $X_{L2}$ is the inductive reactance in the ON-state, i.e. in fault limiting mode and $X_{L1}$ is the reactance in the OFF-state or quiescent state prior to fault occurring. The short-circuit current $I_{sc}$ is determined by the total loop short circuit impedance, $Z_T$ from the generator source $E_q'$ in the transient mode, i.e.

$$I_{sc} = \frac{E_q'}{Z_T}$$

where $$Z_T = \sqrt{(X_d' + X_b + X_{L2})^2 + R_T^2}$$

where $X_d'$ = generator short-circuit reactance $X_b$ = bus-bar or line impedance between generator & short-circuit.

$R_T$ = Total loop circuit resistance

The significance of a high $X_{L2}$ value is that the inequality holds $$X_{L2} \gg X_b \gg X_d' \gg R_T$$

and therefore the total circuit impedance is dominated by the value of $X_{L2}$ or $$Z_T \approx X_{L2}$$

Figure 5:
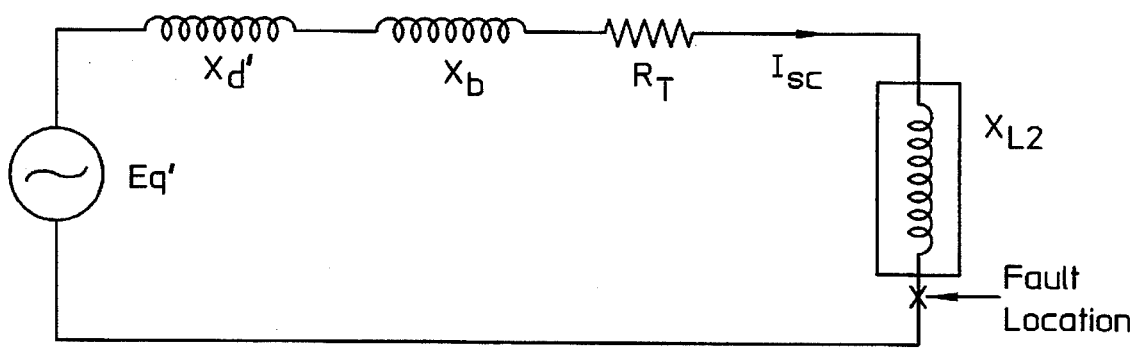
FIG. 5 is a single-phase equivalent circuit of network with fault limiter shown immediately ahead of distribution line line-to-neutral fault.

FIG. 5 shows an equivalent circuit of the network. In the off-state it is essential that $X_{L1}$ is negligible and less than other circuit reactances or $$X_{L1} < X_b < X_d'$$

The numerical values of $X_{L1}$ and $X_{L2}$ may be determined from typical power system values for generator and line reactance as follows:

$$X_d' = 0.23 \text{ per unit}$$

$$X_b = 0.07 \text{ per unit}$$

By way of example if $X_{L1}=0.02$ per unit by suitable choice of winding dimensions and turns, then $X_{L2}=60\ (0.02)=1.20$ per unit. To convert to ohmic values, a 20 MVA base rating is chosen at a 14.4 kV level; the base impedance is determined as $$Z_b = \frac{E_{LN}^2}{S/3} = \frac{(8,314)^2}{(20 \times 10^6)/3} = 10.36 \text{ ohms}$$

Therefore, on a 60 Hz basis:

$$X_{L1}=0.02\ (10.36)=0.208 \text{ ohms or } L_1=0.552 \text{ mH}$$

$$X_{L2}=1.2\ (10.36)=12.44 \text{ ohms or } L_2=33 \text{ mH}$$

The present invention is now described in terms of a working prototype built to demonstrate the concept. The dimensions of key parameters are:

For on-state parameters $g_2=0.50$ mm $\alpha_4=25.4$ mm $\alpha_7=50.8$ mm

Pole area=$\alpha_4 \cdot \alpha_7=1290$ sq. mm.

$$\therefore R_2 = \frac{4(0.50)}{(1290 \text{ sq. mm.})4\pi \times 10^{-7} H/m} = 1.233 \times 10^6$$

Therefore the primary turns on the 2 "C-cores" is $$N = \sqrt{L_2 \cdot R_2} = \sqrt{33 \times 10^{-3}(1.233 \times 10^6)}$$
$$= 201.7 \text{ turns}$$

This total number of turns is distributed into 4 identical coils of 50.5 turns each arranged as two on each C-core in the preferred embodiment. Clearly for other distribution levels than 14.4 kV, the number of turns will be altered to yield the appropriate impedance level. In the preferred embodiment, the described apparatus is appropriate for both single-phase and three-phase fault limiters with operations in voltage and current not to exceed the design rating. The fault current prior to limiting is for the model power system.

Let $E_q' = 8314$ Volts $$Z_T = \sqrt{(0.23 + 0.07 + .02)^2 + (.015)^2}$$
$$= \sqrt{0.32^2 + .015^2}$$
$$= 0.32 \text{ per unit}$$
$$= 3.319 \text{ ohms at 60 Hz}$$

The fault current is thus initially on a 600 A rated line $$I_{sc} = \frac{8314 \text{ V}}{3.319 \Omega} = 2505 \text{ Amps rms or 4.2 per unit}$$

In a response time of 4 ms, the total circuit impedance is changed to $$Z_T = \sqrt{(0.23 + 0.07 + 1.2)^2 + (.015)^2}$$
$$= 1.50 \text{ per unit} = 15.54 \text{ ohms}$$

and $$I_{sc} = \frac{8314 \text{ V}}{15.54 \Omega} = 535 \text{ Amps rms or 0.89 per unit},$$

by way of example, thus limiting fault current to below nominal line rating.

Figure 6:
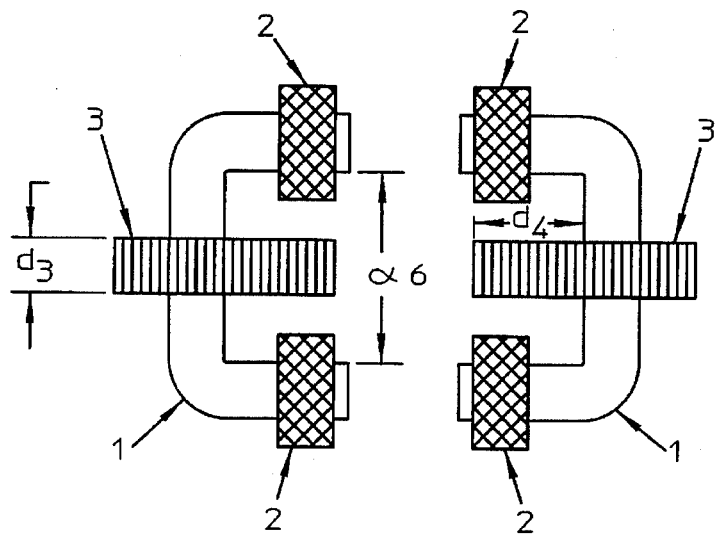
FIG. 6 is a representation of the location of tertiary or superconducting bias coils for offset of core flux.
Figure 7:
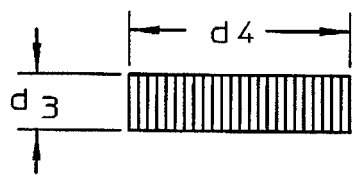
FIG. 7 shows a cross-section of superconducting bias coil in preferred embodiment.

The following now describes the specific apparatus involving the superconducting coils which realize a controllable or adjustable fault limiter. A tertiary electrical winding must be fitted to each primary magnetic core to buck or boost the ampere turns provided by the primary electrical winding connected in series with the utility grid or load since the primary winding will at nominal current otherwise start the rotor disc into movement prior to fault, which is undesirable. Consequently, the primary magnetic cores must be biased or contain bucking ampere-turns which are present up until the instant of the fault and subsequently removed. To minimize heat loss in this extended period of time, the tertiary bias coil may be superconducting with negligible real power dissipation and wound in the preferred embodiment in the interpolar space, sandwiched between the two grid-excited primary coils. FIG. 6 shows one arrangement of the transverse flux magnetic cores 1 with 4 sets of primary coils 2 and two sets of tertiary, superconducting coils 3 per set of magnetic cores.

From the previous example of the prototype fault limiter, each set of cores contains 202 turns and thus at a nominal line current of 600 Amps, the base magnetomotive force excitation is 121.2 kAT. Therefore, the bias coils need to have at least a rating of 150% of this or 182 kAT per set of cores or 91 kAT per side. With the dimensions chosen in the prototype, let bias coil height $d_3=0.65$ ($\alpha_6$)=0.65 (75 mm)= 48 mm and depth=90 mm, total a window area of 4.56 sq. cm. With a typical SC current density for niobium-titanium wire at 19,956 A/sq. cm., the described bias coil carries 4.56×19,956=91,000 Amps-turns. The impedance level of said bias coil is not a crucial parameter and may be conveniently chosen to be greater than the impedance of the primary or series injection coils due to the separate shunt excitation of the bias coils. The baseline bias coil in the prototype has a nominal current of 47 Amps and consequently 91,000/47=1936 turns are required per C-core.

Figure 8:
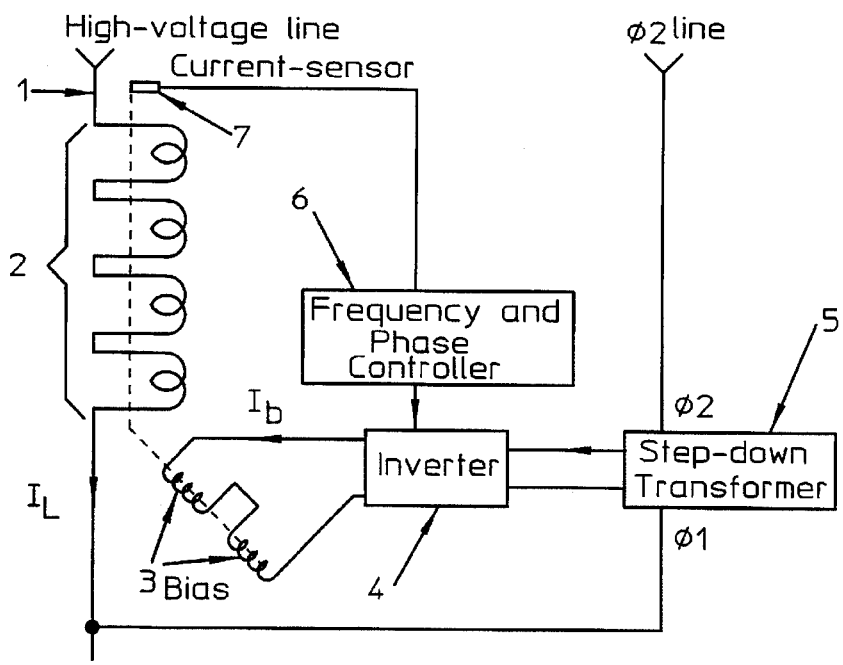
FIG. 8 shows an equivalent circuit for the connection of primary and tertiary coils in a preferred embodiment.

FIG. 8 shows an equivalent circuit for the connection of primary and tertiary coils in the preferred embodiment. Primary coils 2 are inserted in high voltage line 1. Bias coils 3 are energized by variable-frequency inverter 4 fed by step down transformer 5 and frequency/phase controller 6 receiving input from current sensor 7. The bias coils are operated in an AC mode normally at the same frequency as the line voltage but with the option of having the electronic inverter control the amount of asymmetrical component of current or DC offset fed to the bias coils to insure control of the magnetic core characteristics under both symmetrical and asymmetrical short-circuit conditions. In the off-state, bias current $I_b$ as shown in FIG. 8 feeds bias coils of total excitation equal to the primary excitation produced by current $I_L$ form line. The net flux is zero in the airgap and consequently the rotor disc remains stationary.

Figure 9:
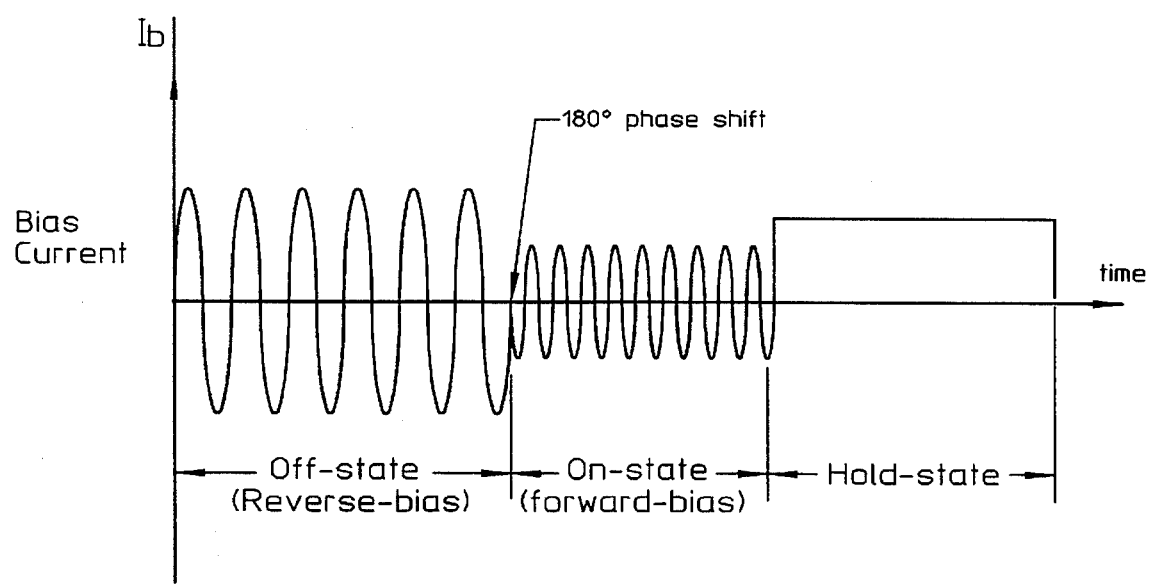
FIG. 9 shows the modes of operation for the bias current using both AC and DC.

When a fault is detected by the rate of change of current $I_L$ at a di/dt value equal to or exceeding a controller present value DI*, the reverse bias is abruptly dropped, $I_b$=0 and the full value of $I_L$ is used to provide repulsion-induction torque on the rotor disc to effect the rapid change in magnetic reluctance. The disc must rotate through angle $\theta_1$ in one-quarter cycle and produces the consequent low reluctance characteristic prior to when the drop off in line current is insufficient to induce heavy propulsive currents in the disc. In this event, the bias coil may be biased forward in the AC mode to assist the primary coil in accelerating the rotor. After the angle $\theta_1$ is attained, the inverter 4 changes into a rectifier mode to provide a high-current DC output for which to magnetically hold the rotor disc in a fixed on-state position and retain the low reluctance position. FIG. 9 shows the three different modes of the bias coil assembly through a typical short circuit. When the system controller decides to restore power or remove the fault limiting function, the DC bias is removed and $I_b$ is again excited in reverse AC bias mode causing disc to reverse rotation and return to $\theta$=0 position with high reluctance mode.

Figure 10:
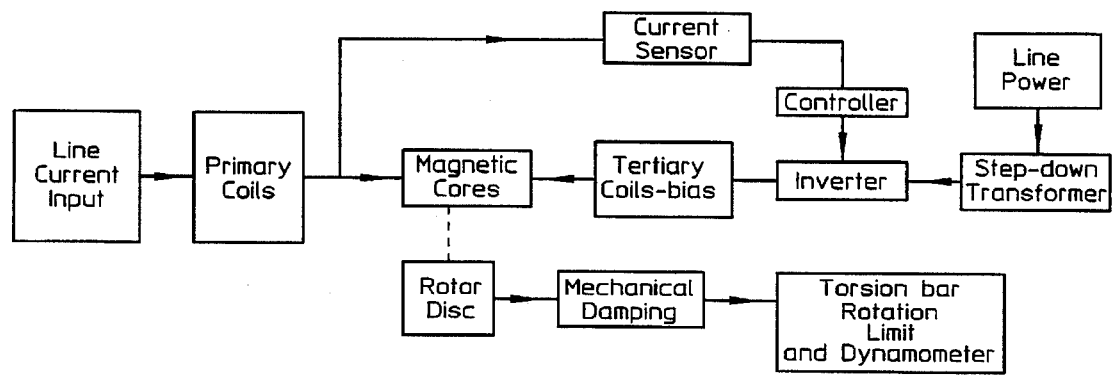
FIG. 10 is a block diagram of a preferred embodiment of a fault limiter with master control scheme.

The preferred embodiment includes mechanical damping such as a viscous fluid damper of the rotor disc to limit angular acceleration in both directions and inclusion of a torsion-bar on the main rotor shaft such the overall apparatus is able to absorb a portion of the fault energy in the mechanical tensioning of the torsion bar. Both mechanical subsystems act in a fashion to limit the maximum angular rotation of the rotor disc to a value less than 360° and also provide a calibrated means by which to measure the intensity of the fault by the magnitude of the angular displacement of the attached torsion bar. FIG. 10 shows the major subsystems.

Figure 11:
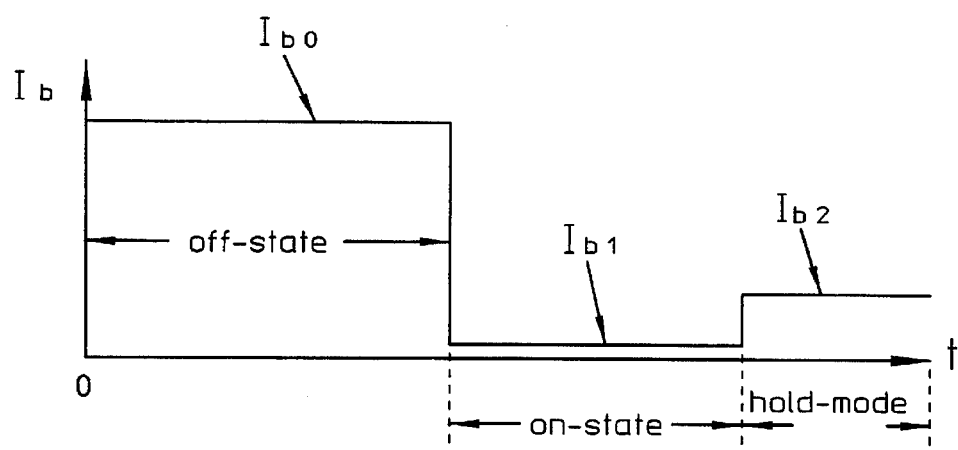
FIG. 11 shows the bias current fault limiter using DC.

The preferred embodiment makes use of superconductors operating with alternating current to effectively control core saturation, etc. However one further embodiment is covered which makes better utilization of the SC wire by allowing either a higher $T_c$ or higher $J_c$ then the equivalent AC operated SC wire. Referring to FIG. 8, pole face 4 may also be an AC to DC converter providing variable DC current to the bias winding of single polarity and insuring that no rotating or traveling magnetic fields are established which would cause disc rotation. FIG. 11 shows a waveform of bias current whereby only DC is applied to the magnetic core bias coil. Level $I_{bo}$ is equal to the peak value of the AC current waveform and $I_{b2}$ is less than 10% of $I_{bo}$, for the hold or latching current. This scheme does not have the ability to electrically retract the disc when only DC is present but relies on use of a mechanical torsion bar or spring assembly to provide reverse torque to return to the start position.

In the simplest embodiment of the invention, the tertiary bias coils would be fed exactly at line frequency with only a modulating or phase-back thyristor controlling the magnitude of bias current but without possibility of controlling phase angle of the bias coil. This is a feasible arrangement for economic or low-cost installations.

This embodiment has certain applicable range of fault limiting operation and must contain an electronic control system to predict the maximum short-circuit characteristic to melt system constraints for adjustable $I^2T$ and asymmetrical/symmetrical current triggering.

Figure 12:
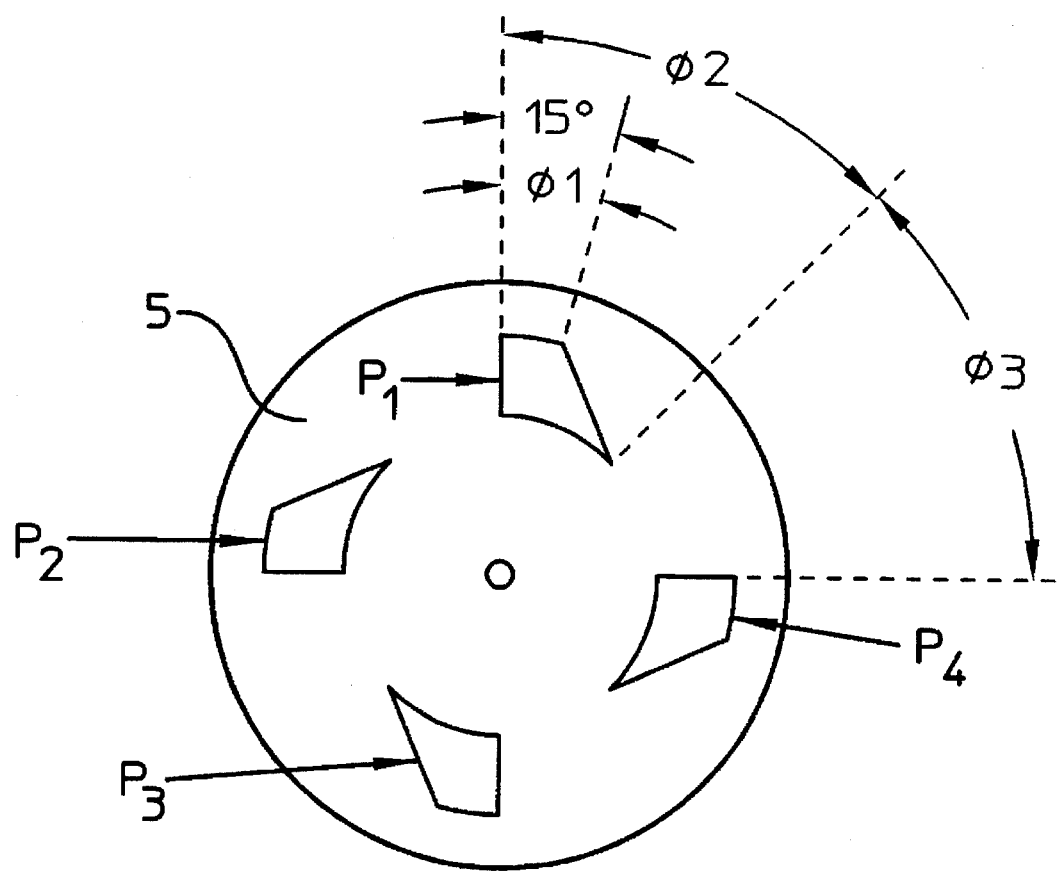
FIG. 12 shows a cross-section of the rotor disc where n=4 poles.
Figure 13:
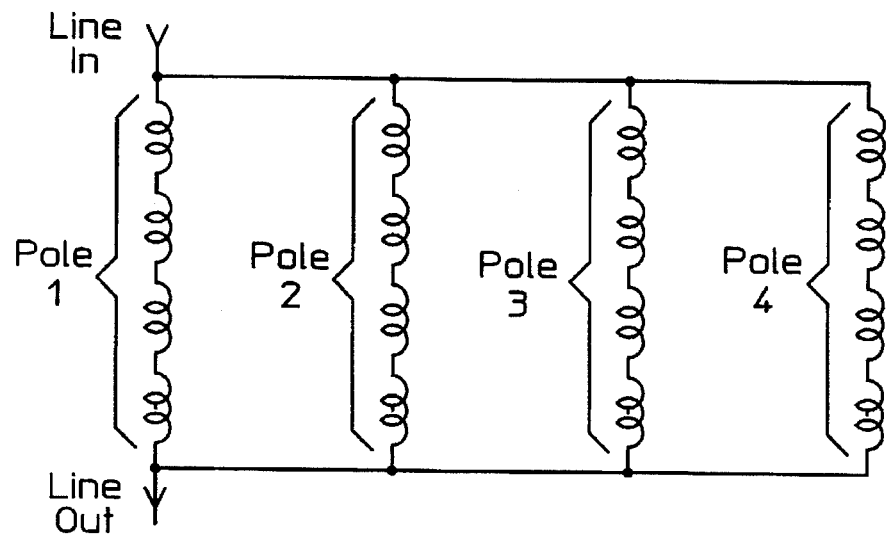
FIG. 13 shows a connection diagram where n=4 in the fault limiter.

The preferred embodiment has a multiplicity of the magnetic cores spaced around the inner periphery of the disc to form a multipolar fault limiter with "n" identical poles per periphery, providing a higher power density structure. The on-state angle $\theta_3$ is limited to under 360/n–$\theta_1$ degrees and for example if $\theta_1$=15°, n=4, then $\theta_3 \leq 75°$. It is also imperative then $\theta_3 > \theta_1$ where $\theta_1$ is set by magnetic design of the minimum possible magnetic pole area to carry the appreciable flux generated in short-circuit modes. FIG. 12 shows a multipolar disc where n=4 and there are non-ferromagnetic, highly conductive disc inserts shown by way of example with a 15° arc and ferromagnetic sector 5 may be arranged to form the principle mechanical support for the conductive inserts. The limiting factor in selection of "n" identical poles is the clearance attainable for construction of the stator windings for both primary and tertiary. Said multipolar construction also allows the possibility of altering the conductive material properties of disc inserts 1–4 to produce variations in the effective terminal impedance by making use of parallel connected primary members as shown in FIG. 13.

Figure 14:
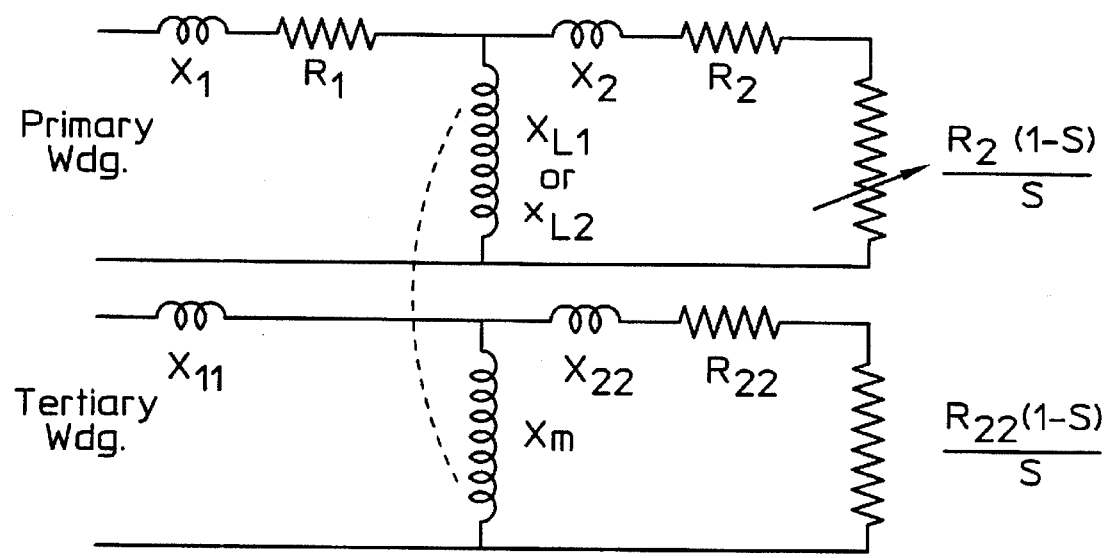
FIG. 14 shows the equivalent circuit for the transverse flux fault limiter with superconducting excitation.

FIG. 14 shows the detailed equivalent circuit for the transverse flux fault limiter with superconducting excitation. $X_1$ is primary leakage reactance, $R_1$ is primary resistance, $X_{L2}$ and $X_{L1}$ are magnetizing or position-dependent reactances of the airgap, $X_2$ is secondary reflected leakage reactance, $R_2$ is the reflected secondary total load resistance, S=per unit slip of disc while accelerating or $(\omega_s-\omega_m)/\omega_s$, $\omega_m$ is mechanical speed and $\omega_s$=synchronous speed. $X_m$ is the magnetizing reactance of the tertiary coil 1 which is mutually coupled to the $X_{L1}$ or $X_{L2}$ magnetic path.

Figure 15A:
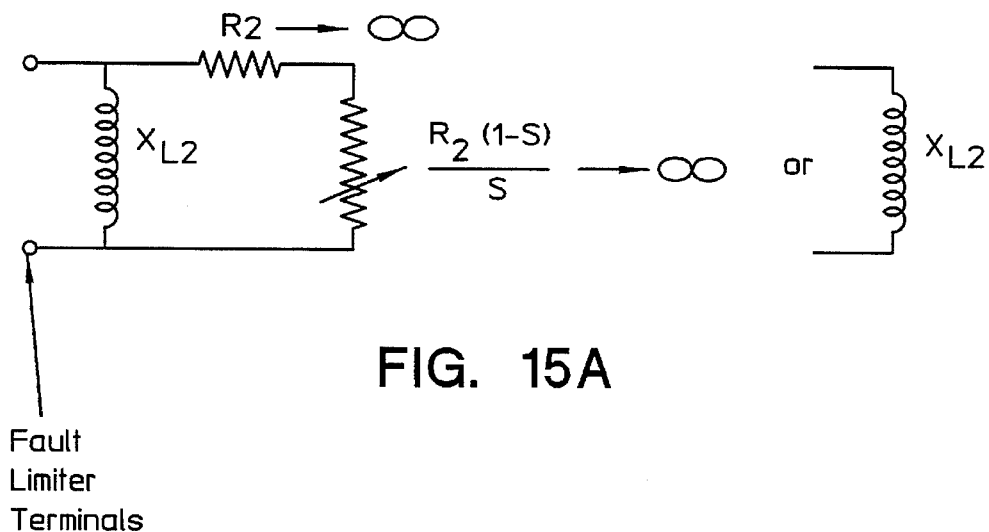
FIG. 15a shows the on-state simplified equivalent circuit.
Figure 15B:
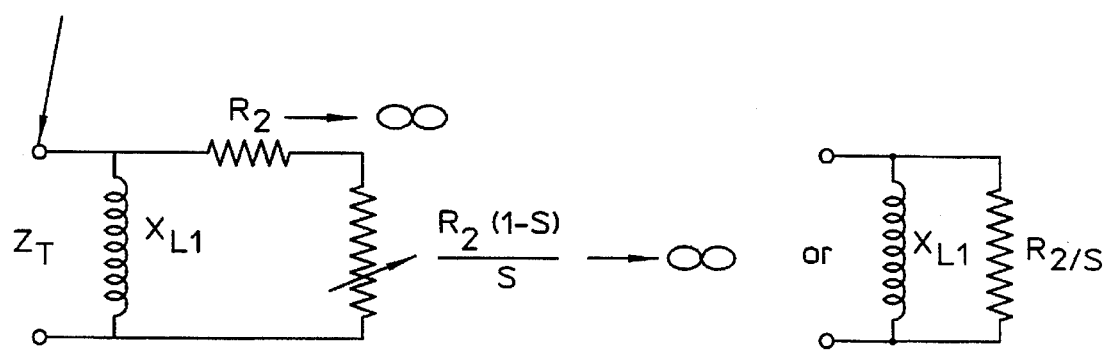
FIG. 15b shows the off-state simplified equivalent circuit.
Figure 16:
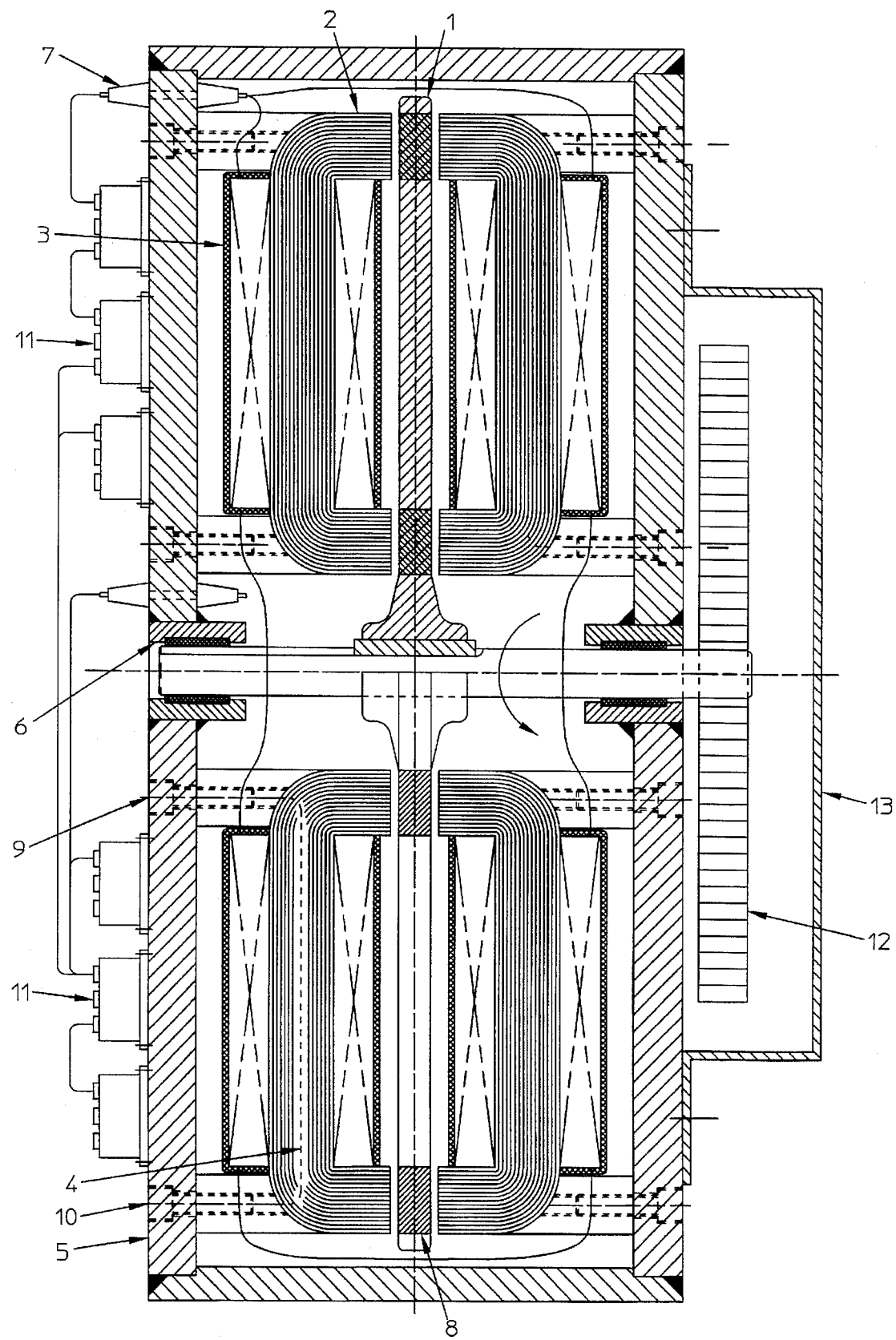
FIG. 16 shows a first type of superconducting fault limiter.
Figure 17:
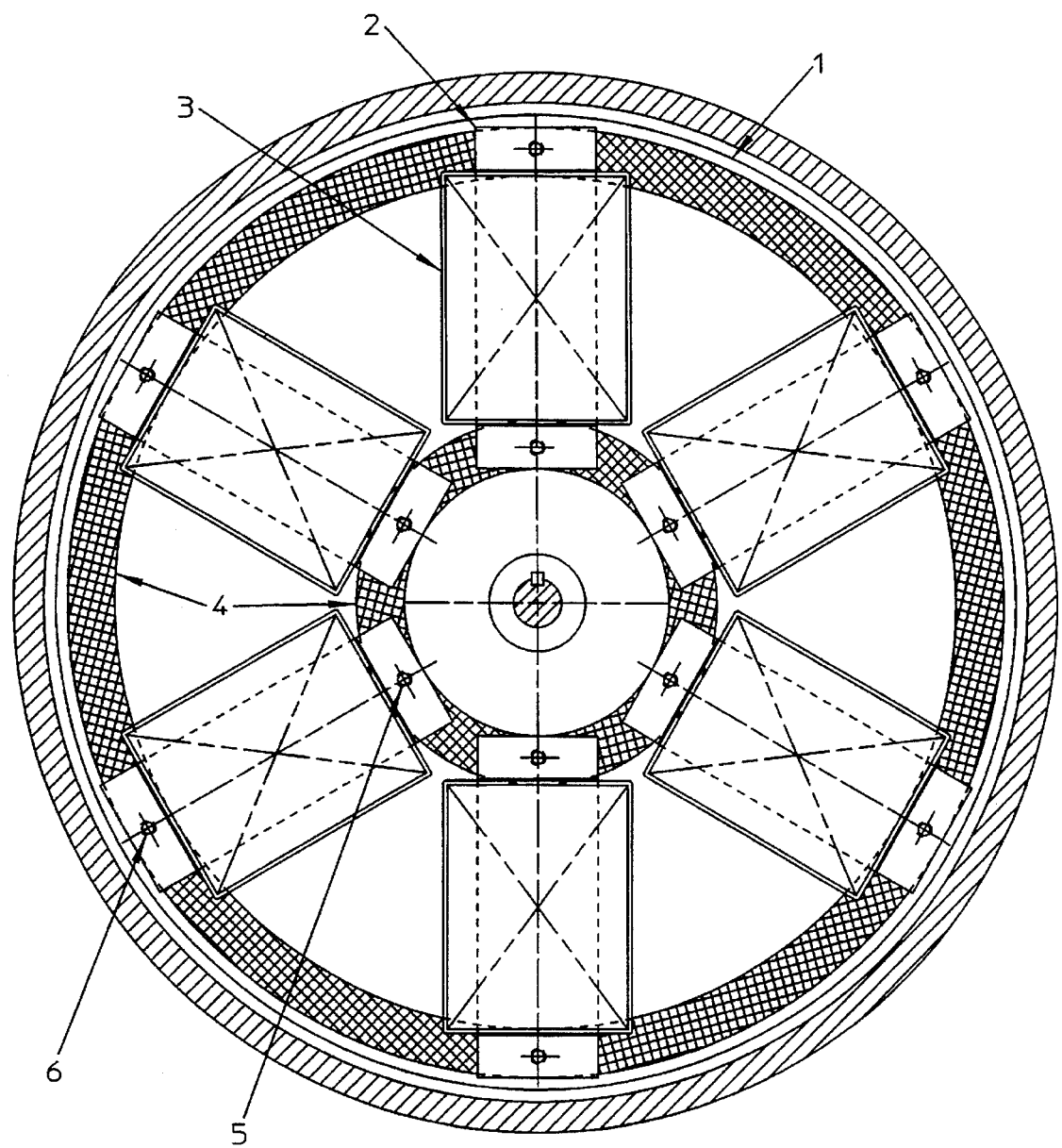
FIG. 17 shows an embodiment of a superconducting fault limiter.
Figure 18:
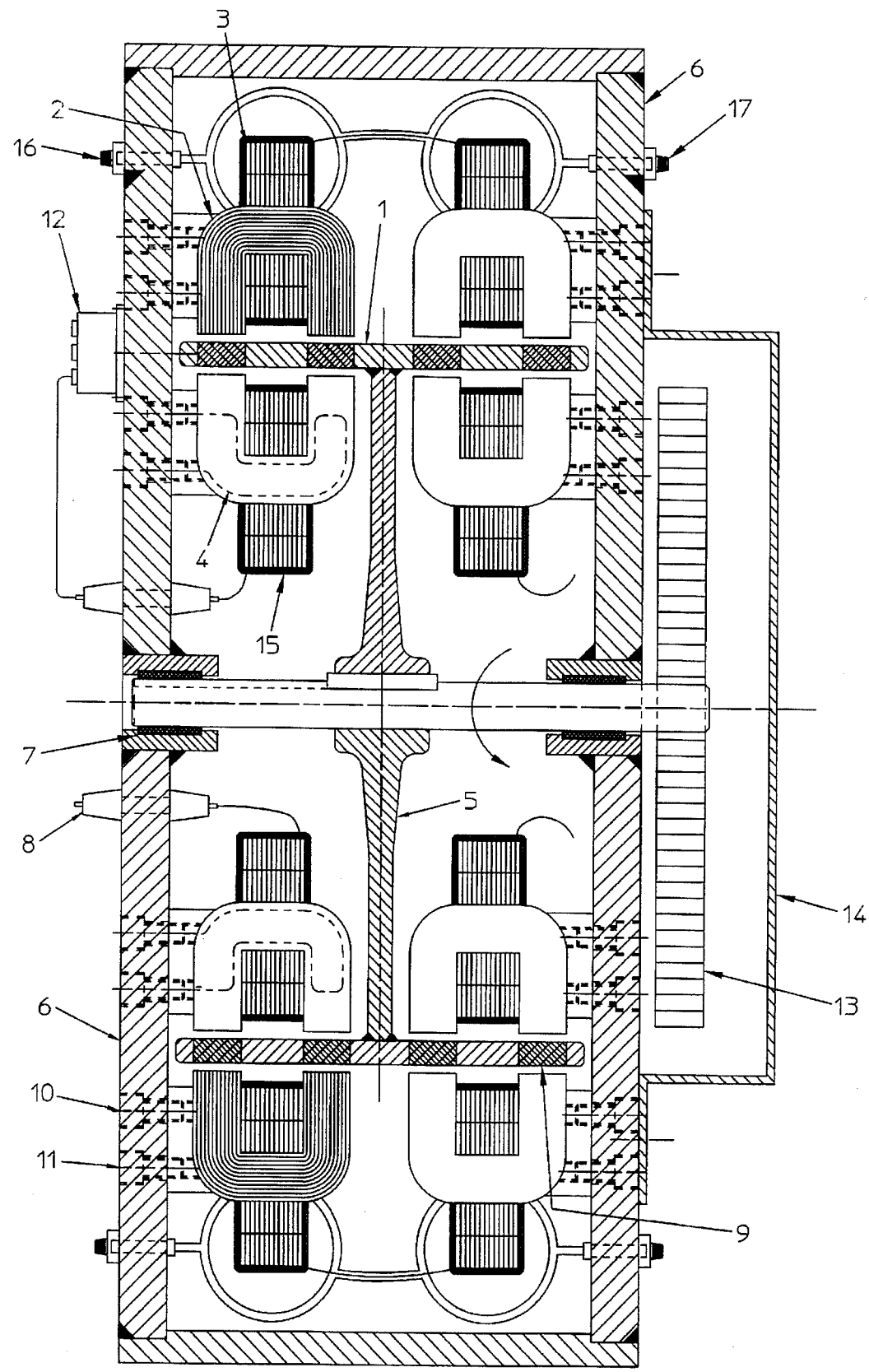
FIG. 18 shows an alternative embodiment of a superconducting fault limiter.

FIG. 15 a shows a simplified equivalent circuit where $X_1$=0, $X_2$=0 and primary resistance is negligible for both normal and SC windings for on-state where $X=X_{L2}$ and $R_2 \to \infty$ as the iron lamination become finer in thickness. FIG. 15b is the off-state equivalent circuit where $X_{L1}$ is in parallel with $R_2/S$ where $R_2$ is finite and a low value since a moderate or highly conductive material forms the secondary member and thus $X_{L1}$ is shunted by $R_2/S$ parameter. If the disc is moving at maximum velocity (S=0) the terminal impedance is $Z_T$=0+j$X_{L1}$. At start, the disc velocity is zero, the terminal impedance is $$Z_{T2} = jX_{L1} \| R_2 = \frac{R_2 X_{L1}}{\sqrt{R_2^2 + X_{L1}^2}}$$

at phase angle $\theta = \tan^{-1} \frac{(R_2/X_{L1})}{}$

By way of example, an acceptable range of $X_{L1}$ is 166–333 µH in the pre-fault mode and the corresponding series impedance is in the range 0.062–0.125 ohms at 60 Hz. An acceptable range of $Z_T$ when in the current limit mode is 3.77–7.54 ohms or a 60 Hz base.

The total series-injected impedance offered to the line will vary from $X_{L2}$ to $Z_{T2}$ over a 4 ms period. The invention provides means to adjust the $R_2$ parameter and ultimately $Z_{T2}$ by specific choice of rotor materials for conducting media such as copper, aluminum, bronze, etc.

Figure 19A:
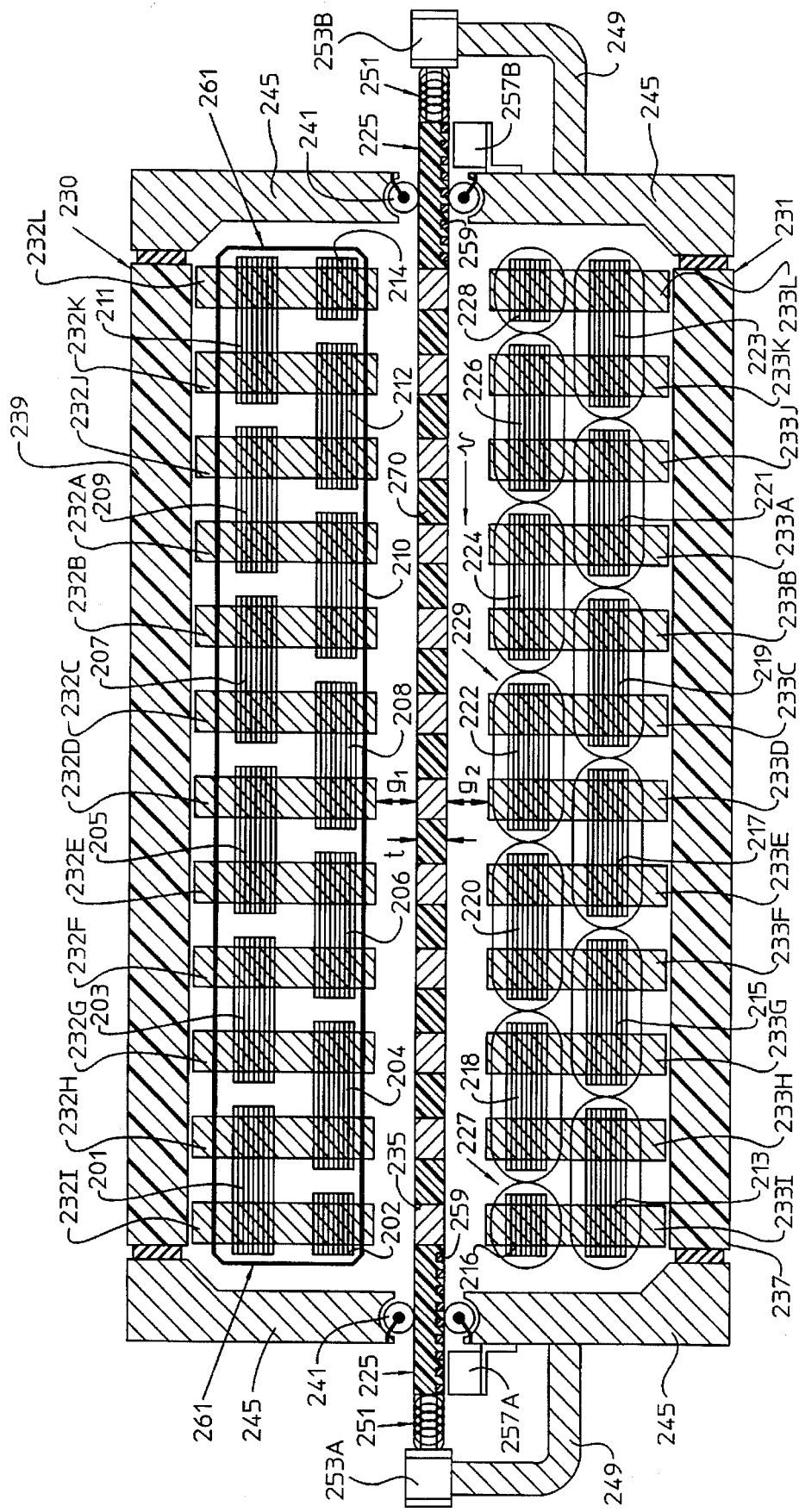
FIG. 19A shows a side view of a 2-pole transverse-flux fault limiter in the direct-axis position.

An alternative embodiment of the subject invention has both primary and tertiary excitation members arranged in a linear array and the secondary electrical member forms the moving member. All three members comprise a transverse flux magnetic circuit whereby the primary electrical member is connected in series with the line or fault current to be limited. The tertiary electrical member has a separate excitation power supply and the secondary electrical member is a passive structure which causes a large change in magnetic reluctance for the flux linking the primary and tertiary members. This change in reluctance is reflected into the primary structure whereby the effective line impedance of the primary is altered by the movement of the secondary member. FIG. 19A shows a composite view of the complete fault limiter as appropriate for high-voltage, high-current fault limiting and having one or greater excitation coils on the primary cooled to a cryogenic temperature including a provision for operating the coils with alternating-current superconducting tape or wire capable of operation in an AC magnetic field with AC excitation at the line frequency. The tertiary electrical member may or may not be cryogenically cooled depending on constraints imposed on overall efficiency, physical volume or ambient temperature. The secondary member is a mixed-permeability, mixed-conductivity plate structure having magnetic (Zone 1) and non-magnetic (Zone 2) zones arranged in tandem and which correspond to the physical layout at the primary or tertiary poles. The thickness of the secondary electrical member is denoted "t" and the airgap from primary to secondary is denoted "$g_1$," the airgap from tertiary electrical member to the secondary is denoted "$g_2$."

The invention operates by induction-electrodynamic repulsion current action in the secondary member due to the net driving MMF which is the phasor summation of the MMF produced by the primary member and the MMF produced by the tertiary member. The secondary operates in a slip mode and has a traveling speed $V_r$ determined by the equation:

$$V_r = 2\tau f(1-\sigma)$$

where f=line frequency (Hz)
$\tau$=pole-pitch of primary (m)

$$\sigma = slip = \frac{V_s - V_r}{V_s}$$

$V_r$=velocity of the armature
$V_s$=synchronous velocity

The number of poles P of primary excitation determine the overall length, L, of the primary structure as $$L_1 = P + 2 \cdot L_{ew}$$

where $L_{ew}$ is the length of end-winding and supporting/ cryogenic structural length. In the preferred and alternate embodiment, the excitation coils of the primary member are series connected on the high-voltage or high-power electrical circuit and thus the product of turns/pole ($N_p$) and number of poles (P) determines the total series turns per phase ($N_s$) as $$N_s = N_p \cdot P$$

In the alternative embodiment, each magnetic core is U-shaped in front view and has the primary excitation coil arranged in two layers for a three-phase fault limiter and termed upper and lower layers. Further, each coil in either layer spans a total of 2 magnetic cores as shown in FIG. 19A whereby upper and lower layers are longitudinally offset by one-half of a coil pitch. This results in a progressive rate of change of MMF and a more efficient magnetic circuit when in a polyphase excitation configuration. Further, each upper or lower coil is divided into right-side and left-side coil halves for ease of manufacture, ease of maintenance and lower leakage inductance of the complete assembly. In the normal operating mode, the right and left coil sides are series connected in high-voltage applications and may be parallel connected for low-voltage, high-current applications.

The preferred arrangement for cryogenically cooling the primary coils has each layer divided into right- and left-side coil halves and each half has a separate cryostat or containment vessel typically composed of a non-conductive and non-ferromagnetic material such as a carbon-fiber, fiberglass or S-glass.

FIG. 19A shows a 2-pole transverse flux fault-limiter in the Direct Axis (D-Axis) position wherein 12 magnetic cores are shown embodied in both primary structure 230 and tertiary structure 231. The primary magnetic cores 232A through 232L are laminated U-shaped ferromagnetic cores with typically 7 mil thick laminations. The tertiary magnetic cores 233A through 233L are similar in construction and magnetic cross-section to primary cores 232 but may have a different magnetic path length or depth dependent on the wall thickness or depth of the cryostats 227, 229. The primary magnetic cores are enclosed by a singular cooling vessel 261 which may be pressurized or at a vacuum and may take the form of a low temperature cryotstat or another cooling medium such as freon or water coolant. The embodiment has two general styles of cryostats: a long cryostat 227 covering a full-pitch coil and a short cryostat 229 covering a half-pitch coil as used in the end-zone exclusively. Racetrack-shaped conductive coils 201,203,205,207,209, 211 comprise the upper layer of the primary and racetrack-shaped conductive coils 202, 204, 206, 208, 210, 212, 214 comprise the lower layer of the primary winding. These are generally manufactured of non-superconducting wire.

Racetrack-shaped conductive coils 213, 215, 217, 219, 221, 223 comprise the lower layer of the tertiary winding and racetrack-shaped conductive coils 216, 218, 220, 222, 224, 226, 228 comprise the upper layer of the tertiary winding. Airgap g1 is between the lower surface of the primary cores and the upper surface of the reaction member 225; airgap $g_2$ is between the upper surface of the tertiary and the lower surface of reaction member 225. The reaction member has thickness "t" and contains magnetic inserts 235 spaced at intervals of one core pitch corresponding to the pitch of individual magnetic cores on the primary or tertiary structure. Area 270 of the reaction member is an electrically-conductive, non-ferromagnetic material such as beryllium copper, phosphor bronze or aluminum. FIG. 19A is specific to the position of the reaction member when in the "Direct Axis", as the magnetic inserts 235 line-up with the magnetic cores in the same vertically oriented plane; this yields the minimum reluctance for the primary winding and the maximum inductance for the fault limiter system.

Each reaction member 225 has a mechanical coil spring 251 mounted as one unit or a plurality of assemblies at each end which is rigidly attached to left and right-side stationary shock dampers 253A, 253B. The vertical movement of the reaction member is constrained by four roller assemblies 241. End-shields 245 and end-brackets 249 are composed of a non-ferromagnetic, non-conductive structural material such as a fiberglass-epoxy composite. The horizontal position of the reaction member is sensed by position sensors 257A, 257B which interact with y-directed slots or optical patterns 259 on both ends of the reaction member, located between the active zone enclosing pieces 235 and 270 and the coil spring attachment point. Position sensors may in the form of a digital encoder using optical pick-up, a magnetic reluctance sensor or other suitable apparatus which yields high resolution linear position sensing with less than 1 part in 200 error.

The 2-pole assembly as shown in FIG. 19A contains a total of 26 coils arranged as shown in Table 1. The group 1 have $N_1$ series turns, group 2 has $N_2$ series turns, group 3 has $N_3$ series turns and group 4 has $N_4$ series turns. Groups 1 and 2 representing the high-voltage line coils are wound for a basic insulation level (BIL) voltage above ground as appropriate to ANSI/IEEE or other applicable standards. For example, for a 15 kV line potential on the primary, the coil groups 1 and 2 are insulated for 95 kV impulse voltage above ground.

Figure 19B:
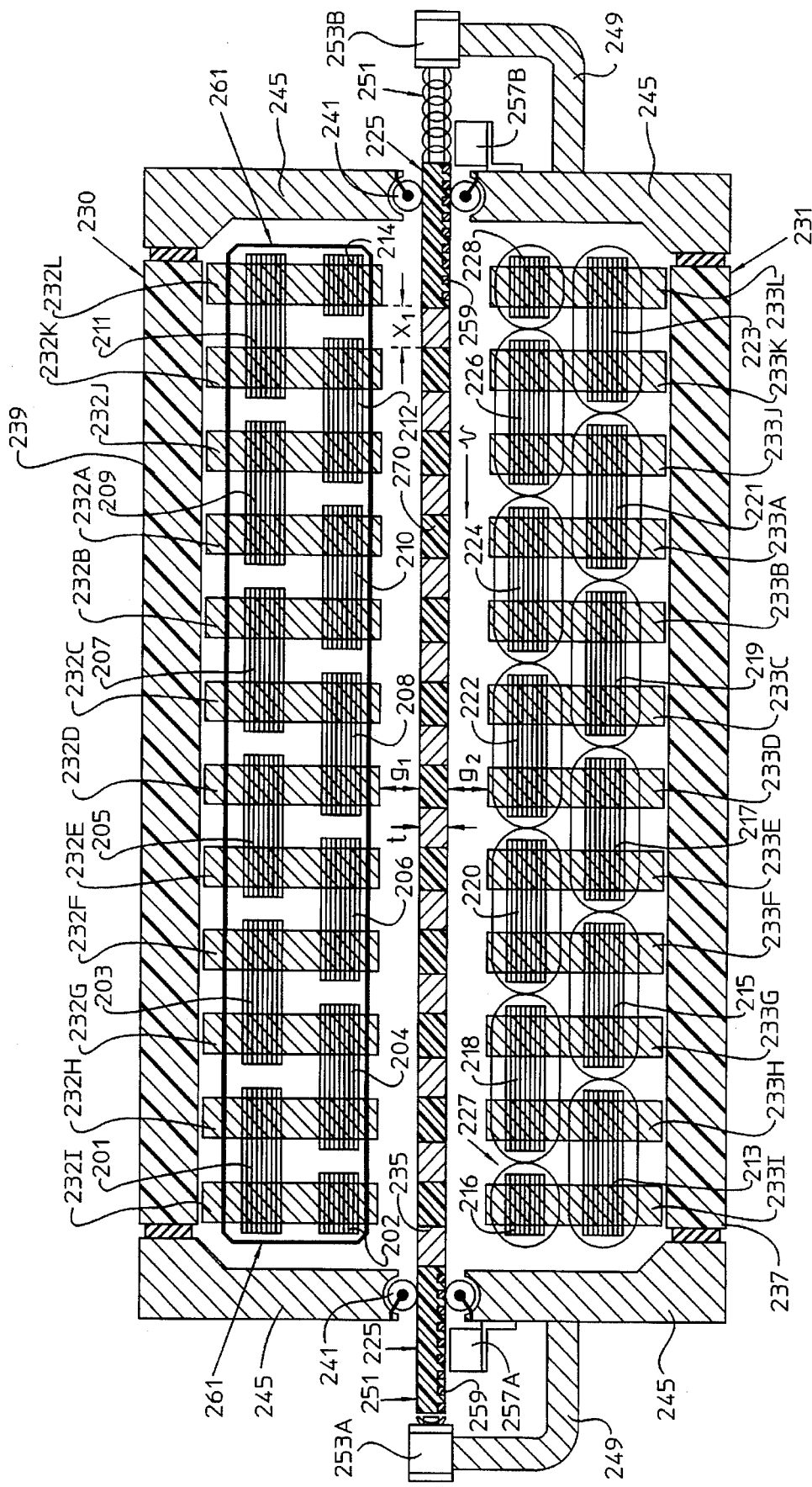
FIG. 19B shows a side view of a 2-pole transverse-flux fault limiter in the quadrature-axis position.

FIG. 19B shows the same assembly as in FIG. 19A which the exception that the reaction member is in the "Q-axis" or quadrature axis position indicating that this is the maximum reluctance condition or minimum inductance condition for the primary winding.

TABLE 1

| Group | Coil Designations | Turns | Group | Coil Designations | Turns |
|---|---|---|---|---|---|
| Primary Coil Designation for 2-Pole Fault-Limiter Ref. FIG. 19A and FIG. 19B. | | | | | |
| 1 | 201 | $N_1$ | 1 | 208 | $N_1$ |
| 2 | 202 | $N_2$ | 1 | 209 | $N_1$ |
| 1 | 203 | $N_1$ | 1 | 210 | $N_1$ |
| 1 | 204 | $N_1$ | 1 | 211 | $N_1$ |
| 1 | 205 | $N_1$ | 1 | 212 | $N_1$ |
| 1 | 206 | $N_1$ | | | |
| 1 | 207 | $N_1$ | 2 | 214 | $N_2$ |
| Tertiary Winding Coil Designation for 2-Pole Fault-Limiter Ref. FIG. 19A and FIG. 19B. | | | | | |
| 3 | 213 | $N_3$ | 3 | 221 | $N_3$ |
| 3 | 215 | $N_3$ | 3 | 222 | $N_3$ |
| 4 | 216 | $N_4$ | 3 | 223 | $N_3$ |
| 3 | 217 | $N_3$ | 3 | 224 | $N_3$ |
| 3 | 218 | $N_3$ | 3 | 226 | $N_3$ |
| 3 | 219 | $N_3$ | 4 | 228 | $N_4$ |
| 3 | 220 | $N_3$ | | | |

In most cases, $N_1=N_2$ and $N_3=N_4$. In a 3-phase system, coils connected in the same phase are series connected in alternating polarity, that is a 180° phase reversal among adjacent coils as shown in FIG. 20, the winding layout.

Figure 20:
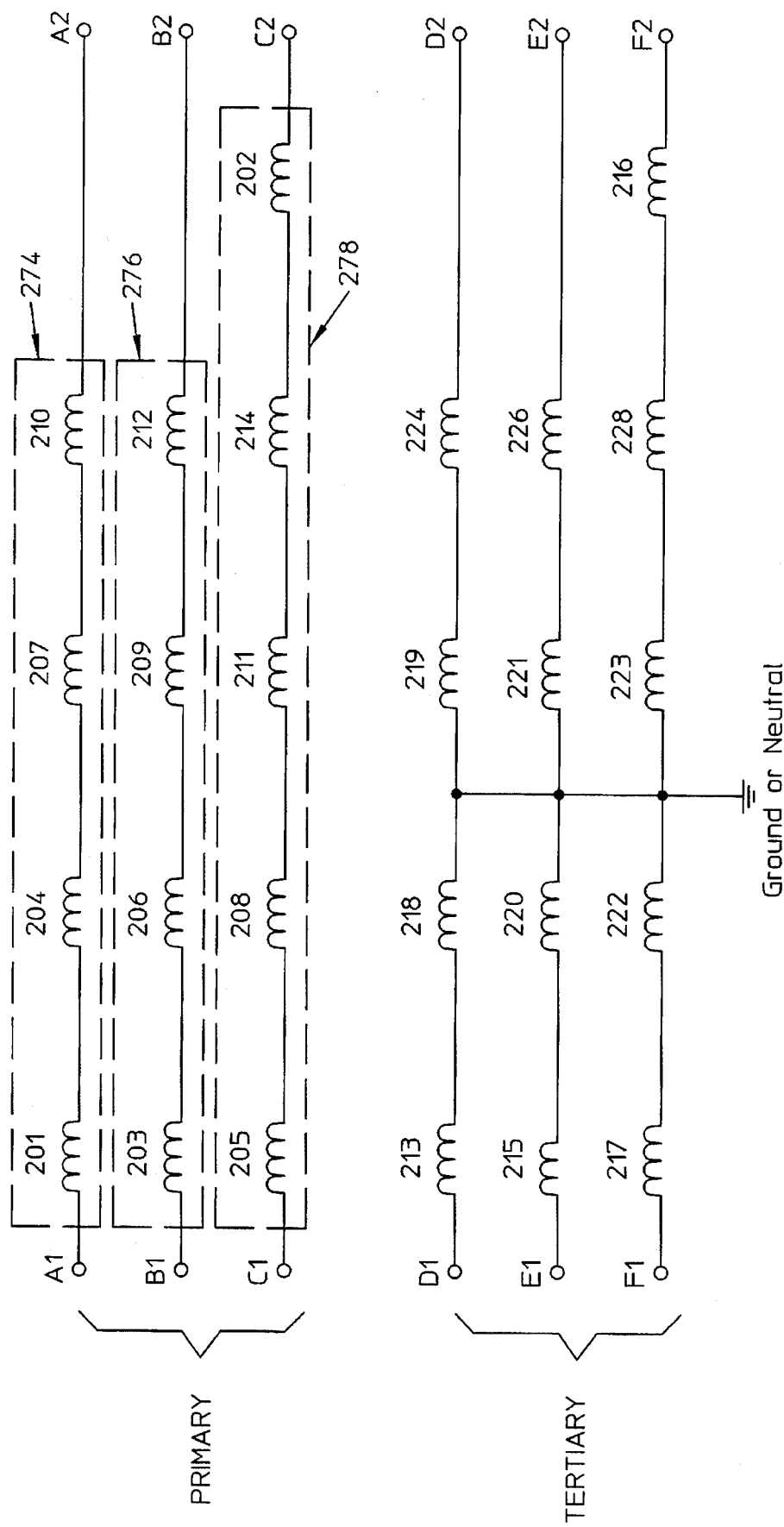
FIG. 20 shows primary and tertiary coil groups for a 3-phase fault limiter with 26 coils total and indicating arrangement of ground the tertiary coil group.

FIG. 20 shows primary coil groups having terminal connections A1, A2, B1, B2, C1, C2 for series connection to the line input. The complete series winding for Phase A is designated 274, the complete series winding for Phase B is designated 276 and the complete series winding for Phase C is designated 278. Tertiary coils 213, 218, 219, and 224 comprise Phase D. Tertiary coils 215, 220, 221, 226 comprise Phase E. Tertiary coils 217, 222, 223, 228 comprise Phase F. However, all three tertiary coil groups are grounded at the mid-point of each phase winding, designated "G" and designated D1, D2, E1, E2, F1, F2 at the terminals.

Figure 21:
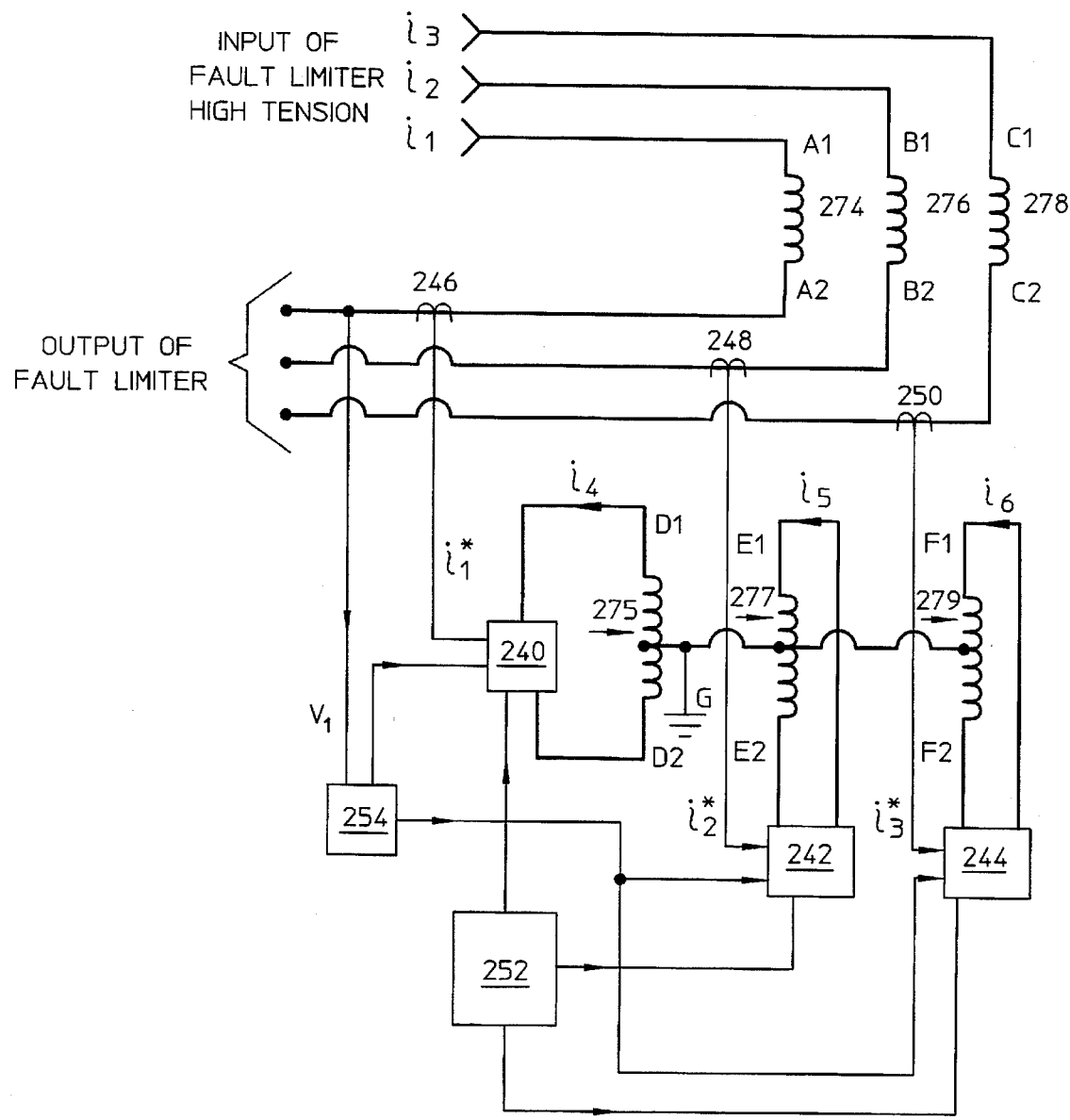
FIG. 21 shows a schematic diagram of a 3-phase fault limiter with grounded tertiary coil groups and series connection of the primary coil group with the external power system and independent power supplies feeding the tertiary coils.

Each phase terminal of the tertiary is connected to a variable-phase variable-frequency current-controllable power supply 240, 242, or 244 as shown in FIG. 21 which shows the system layout for a 3-phase system. Primary line current is monitored by non-saturating, linear current sensors 246, 248, 250. The power source 252 for power supplies 240, 242 and 244 may be line power from an external source through a step-down transformer, a battery or an uninterruptible power supply (UPS). A potential transformer 254 provides each tertiary winding power supply with phase angle information and line voltage signals for control purposes. The primary line currents are represented as $$i_1 = I_1 \sin(\omega t) + I_{o1}$$

$$i_2 = I_1 \sin(\omega t - 120°) + I_{o2}$$

$$i_3 = I_1 \sin(\omega t - 240°) + I_{o3}$$

The tertiary currents are $$i_4 = I_3 \sin(\omega t - \alpha - 180°) + I_{o4}$$

$$i_5 = I_3 \sin(\omega t - \alpha - 300°) + I_{o5}$$

$$i_6 = I_3 \sin(\omega t - \alpha - 60°) + I_{o6}$$

where

ω=radian electrical frequency
$I_1$=Magnitude of fault-current—AC component
$I_{o1}$=DC—offset of phase 1 fault current
$I_{o2}$=DC—offset of phase 2 fault current
$I_{o3}$=DC—offset of phase 3 fault current
α=adjustable phase-angle of tertiary currents
$I_3$=magnitude of tertiary current from power supply
$I_{o4}$=DC offset for phase D tertiary current ($i_4$)
$I_{o5}$=DC offset for phase E tertiary current ($i_5$)
$I_{o6}$=DC offset for phase F tertiary current ($i_6$)

In general, the fault limiter operates by a differential in MMF across the airgap from primary to tertiary excitation and accordingly in the steady-state condition when $I_1$ is below a certain threshold level $I_x$, there is no net movement of the secondary and $$I_3 = I_1$$

$$I_{o1} \sim I_{o2} \sim I_{o3} \sim 0, \; I_{o4} \sim I_{o5} \sim I_{o6} \sim 0$$

When a fault occurs as signified by either of two conditions a. $I_1 > I_x$ or
b. $I_{o1} > I_y$, $I_{o2} > I_y$, $I_{o3} > I_y$ where $I_y$ is the threshold value of DC offset current for the case of asymmetrical faults. In most normal power system faults, one random phase will be nearly fully offset and have a large asymmetrical current whereas the other two phases will have relatively small offset and a small asymmetrical component. In the case of a maximum asymmetrical fault, the maximum rms value of this waveform will be 1.66 times the maximum rms value of a symmetrical fault current.

FIG. 21 shows three variable-phase variable frequency power supplies 240, 242, 244 which comprises means for regulating the tertiary MMF that is directly proportional to tertiary current $i_4 i_5 i_6$ such that if the rate of change of primary current $i_1 i_2 i_3$ at or about current-zero in any phase of a polyphase system is below a threshold level for a fault, the tertiary MMF is equal and opposite in phase relation to the MMF of the primary coil 274, 276, 278. Therefore, movement of the secondary plate 225 in FIG. 19A is precluded and the primary structure 231 exhibits minimum inductance characteristic when connected in series with an external power system.

FIG. 21 shows the apparatus for regulating the tertiary MMF such that if the rate of change of primary current $i_1 i_2 i_3$ at or about current-zero condition in any phase of a polyphase system is at or above a predetermined threshold level for a fault, then the variable-phase variable-frequency power supply excites the tertiary winding 275, 277, 279 with an MMF in phase with the MMF of the primary winding 274, 276, 278 and significantly higher than the primary MMF in magnitude thereby causing an acceleration of the secondary plate 225 and consequent decrease in the magnetic reluctance of the magnetic flux linking the primary winding and consequently the primary winding exhibits a maximum inductance characteristic.

FIG. 21 includes an apparatus for measuring a negative sequence component of the primary current through current sensors 246, 248, 250 and regulation of the MMF produced by the tertiary coil 275, 277, 279 responsive to the magnitude of negative sequence current such that if the magnitude or rate of change of primary negative sequence current exceeds predetermined threshold levels, the power supply 240, 242, 244 will produce a positive sequence current $i_4 i_5 i_6$ output, sufficiently large to produce a tertiary MMF capable of rapid and sustained forward acceleration of the secondary plate 225 (Ref. FIG. 19A, 19B) and consequent decrease in magnetic reluctance of the primary coil 274, 276, 278 in the presence of a primary MMF which produces a component of force in a reverse direction or a zero-sequence magnetic field.

FIG. 21 includes an apparatus for measurement of zero-sequence component of the primary current $i_1 i_2 i_3$ and regulation of the MMF produced by the tertiary coil 275, 277, 279 response to the magnitude of zero sequence current such that if its magnitude or rate of change of the total primary current $i_1 i_2 i_3$ exceeds predetermined threshold levels, the independent controllable power supply 240, 242, 244 will output a positive sequence current $i_4 i_5 i_6$ sufficiently large to produce a tertiary MMF capable of producing rapid and sustained forward acceleration of the secondary plate 225 (Ref. FIG. 19A, 19B) and consequent decrease in the magnetic reluctance of the primary winding despite the presence of a primary MMF which produces a zero-sequence magnetic field or a component of force in a reverse direction.

FIG. 21 shows an apparatus and means whereby a variable-phase, variable-frequency tertiary current $i_4 i_5 i_6$ forms a system of bi-lateral or regenerative power flow between the tertiary coils 275, 277, 279 and the input power source 252 for the variable-phase variable-frequency power supply 240, 242, 244 feeding said tertiary coils whereby the input power source 252 may be the external utility line 271, 272, 273, an isolated power source or other electrical generation source with regenerative power capability.

FIGS. 22A and 22B show a top-view along the airgap plane of a 2-pole fault-limiter, tertiary side with 2×12 magnetic cores, corresponding to the side-view shown in FIGS. 19A and 19B. The magnetic U-cores are designated 233A through 233H. Four representative coil leads are shown as 238A, 238B, 239A and 239B.

FIG. 22A shows the top-view for the top-layer of the tertiary coil set closest to the airgap (or secondary) and FIG. 22B shows the bottom-layer tertiary coil set for the set closest to the bottom of the U-core; herein is shown the method of overlap for coils of the same type in a double-layer winding. In FIG. 22A, a representative connection from coil 218A to coil 224A and a separate connection from coil 218B to coil 224B are shown. In FIG. 22B, a representative coil connection is shown from coil 215A to coil 221A and from coil 215B to coil 221B. The specific example shows adjacent coils in either top or bottom layer with a 60° phase advance arranged as

| | |
|---|---|
| $\phi D - \phi E - \overline{\phi F} - \overline{\phi D} - \phi E - \phi F$ | Top layer |
| $\phi D - \phi E - \phi F - \overline{\phi D} - \overline{\phi E} - \overline{\phi F}$ | Bottom layer | where the over-line notation indicates a phase reversal with respect to the non-lined designation.

The combination of a double-layer winding with 60° phase changes results in adjacent magnetic cores having a 30° phase change in steady-state conditions for a 3-phase system. In the alternate embodiment, both primary and tertiary magnetic systems have the same inherent phase change per longitudinal dimension. The MMF loading is calculated on the basis of ampere-turns per meter longitudinal.

The EMF per coil on the primary, V, is calculated according to $$V = 4.44 f N_c K_{dp} \Phi \times 10^{-8} \text{ Volts rms}$$

where
- f=line frequency (Hz)
- $N_c$=number of turns/coil
- $K_{dp}$=pitch and distribution factor
- $\Phi$=flux in two magnetic cores in lines/sq. in.

The primary flux $\Phi$ reaches the maximum "base" value when the fault is being limited (maximum inductance insertion in the power system) and the tertiary MMF is commanded to be zero by the control system. Consider the following design example for a 480 volt fault limiter with 2-poles unit and 4 coils in series/pole and 20 sq. in. core surface $$V = \frac{480}{4\sqrt{3}} = 69.3 \text{ volts/coil}$$

$$f = 60 \text{ Hz}$$

The maximum magnetic flux density in silicon steel cores can be 116,000 lines/sq. in. and there is 4.0 sq. in. area per pair of cores. The base magnetic flux is therefore $$\Phi = 464 \text{ kilo-lines}$$

The distribution factor $K_d$=1.0.
The pitch factor $K_p$=sin (2/6*90°)=0.50 for 2 cores linked within a full pole-pitch of 6 core lengths.
The turns/coil are therefore:

$$N_c = \frac{69.3 \times 10^8}{(4.44)(60)(0.50)(464,000)} =$$

112 turns for both halves as a group

Figure 23:
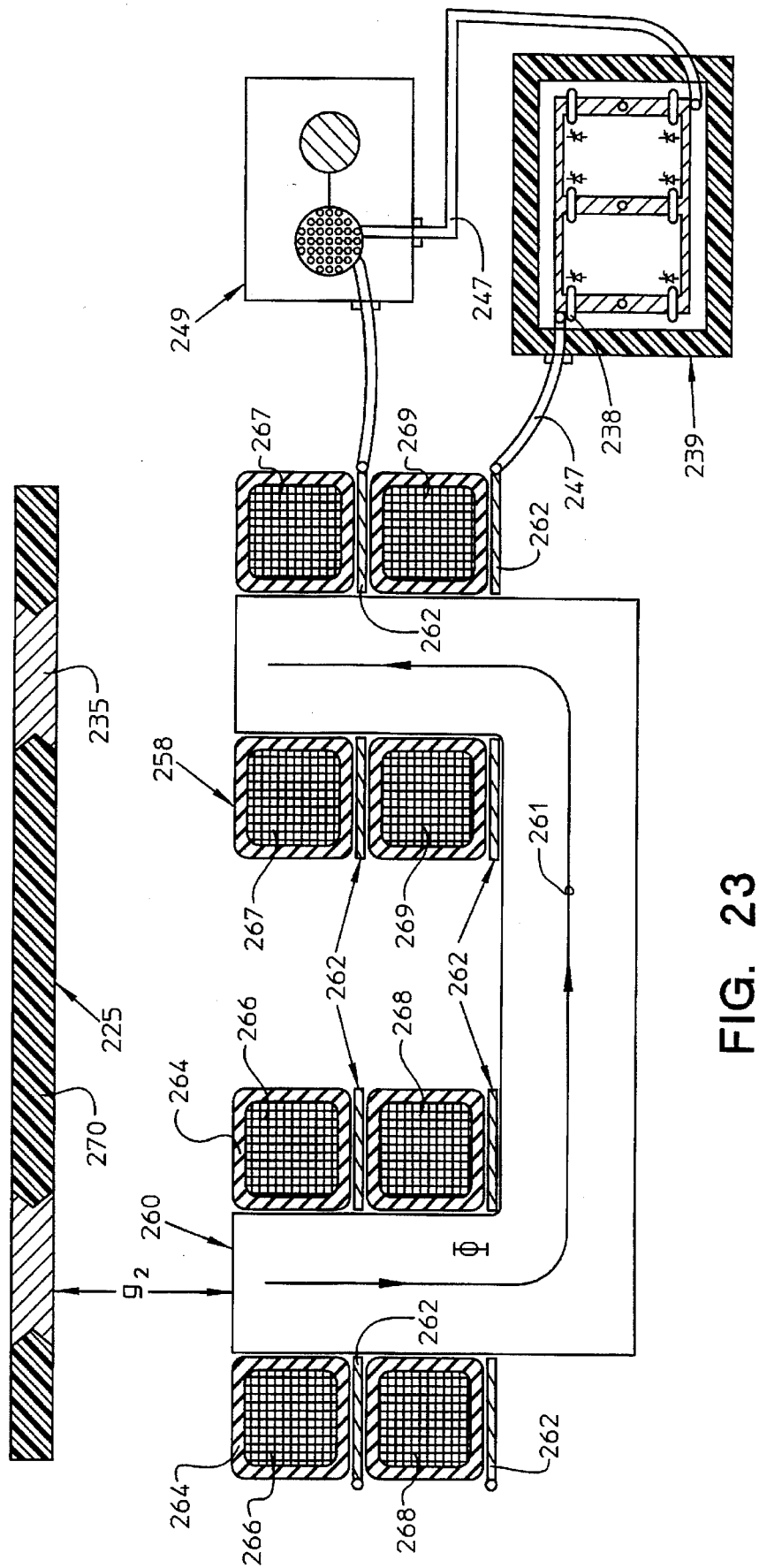
FIG. 23 is a vertical-transverse view of double-layer tertiary coil group, associated u-shaped magnetic core, cooling plates, power supply and associated external refrigeration or liquefier system for the cryogen.

For a 600-amp rating to the fault limiter for continuous current, a water-cooled coil current density of 18.6 A/sq. mm. is typical and thus each conductor will have a cross section of 600/18.6=32.2 sq. mm. or a strand will comprise 5.66 mm.×5.66 mm. Therefore, a coil of 56 turns will occupy 1800 sq. mm. or 39.6 mm.×45.4 mm. as shown in FIG. 23 which is an end-view of the primary winding layers, 258 and core 260 of a 480 volt fault limiter. The liquid cooling cold-plate, 262 contacts the high voltage insulation system, 264 surrounding the conductor strands, 266, 267, 268, 269 of each coil. Strands 266 and 267 are typically of the same electrical phase and strands 268 and 269 are typically of the same electrical phase connected in a series-aiding configuration to mutually increase the magnetic field in the airgap or core.

FIG. 23 shows an apparatus and means for cryogenically cooling the independent power supply 239 by the same cooling loop 241 as flows through the tertiary coil liquid cooling cold-plate 262. This provides a cryogenic temperature coolant to the semiconductor devices 238 and associated circuitry 237 comprising the independent power supply 239 thereby providing a means to minimize internal power dissipation due to semiconductor device forward voltage drop, snubber capacitor dissipation and resistive-divider power losses. This cooling technique may also be used to minimize the physical volume of the power supply 239.

The magnetic flux $\Phi$ is designated 261 for the mean path of flux through the magnetic core 260.

FIG. 24A shows a top-view of the secondary electrical member 225 which in the alternate embodiment is an electrically-conductive plate, 270 with ferromagnetic inserts 235 arranged in a longitudinally-oriented array corresponding in longitudinal pitch to the spacing of the primary magnetic cores shown in FIGS. 19A, 19B, 4A and 4B. The longitudinal span $\tau_s$ of one insert, 235, is in the alternate embodiment less than or equal to the longitudinal dimension or span $\tau_b$ of a primary magnetic core top; the exact dimensioning determined by the final inductance ratio of the complete unit, and the amount of fringing flux in the airgap. FIG. 24A specifically shows the span $\tau_s$ equal to the spacing $_b$ along the conductive plate, 270, between inserts. The transverse spacing of inserts, $\tau_t$ is a third critical design parameter.

The other type of secondary electrical member, 225, is shown in FIG. 24B whereby conductive plate 270 has magnetic inserts, 235, but the longitudinal spacing is altered such that the dimensions are $\tau_b > \tau_s$. This is known as the low-leakage flux design for inter-polar flux. In general the dimension $\tau_s > \tau_b$ for 50 and 60 Hz applications depends on the airgap spacing and on the absolute limit on high value of terminal inductance.

FIG. 24B represents a preferred arrangement for maximizing the inductance ratio from non-fault to fault conditions. This is the baseline design for the prototype unit constructed, described herein.

FIG. 24C represents the case where $\tau_s > \tau_b$ and has higher than average leakage flux from core to core as shown diagrammatically as flux $\Phi_l$ which is directed in the longitudinal direction. In applications where the ratio of high inductance/low inductance is in the order of 20:1, it is appropriate to use the design shown in FIG. 24C.

The material choice for an electrically conductive plate 270 may be one of the following materials:

High-conductivity aluminum 6101-T64

Medium-conductivity aluminum 6061-T6

Copper or beryllium-copper CDA-172

Brass or bronze

The material choice for the magnetic insert 235 may be one of the following materials:

1. Laminated silicon steel with high-magnetic permeability such as trade names "Hiperco 50A, Permendur or Hypersil" with AC induction of exceeding 16 kilogausses at 2.0 Oersteds magnetization at 60 Hz($\mu_r > 32,000$).

2. Solid magnetic steel with medium to high magnetic relative permeability as defined by $u_r$ greater than 8,000.

It is advantageous to use laminated silicon steel so as to reduce the circulating currents or stray eddy currents to a minimum in the magnetic insert. The x-plane-y-plane cross-section of the magnetic insert can in the preferred embodiment be the same as the cross-section of the primary pole pieces, for example, of rectangular or square cross section. This results in an abrupt change of inductance versus time. FIG. 24B shows in the dotted outline 272 the placement of the primary magnetic core pole-pieces as an overlay when the fault limiter is in the Direct Axis mode. This indicates that the cross-section section of the primary poles are slightly larger than the magnetic insert cross-section on both the transverse and longitudinal edges by dimensions of 0.25 g, and 0.50 g, respectively. This modification yields a more stable operation when the apparatus is in the fault limiting or high-inductance mode.

FIG. 24D shows an alternate embodiment of the secondary electrical member 225 for a linear-type cryogenic fault limiter. The conductive plate 270 has magnetic inserts 237 which are trapezoidal in cross section with the leading edge having an angle disposed in the direction of travel, shown by the arrow such that the edge entering the primary pole region is the leading edge of insert 237 when changing from low to high inductance. When the maximum inductance position is attained, the alignment will be as shown in FIG. 24D. The angle $\alpha_{22}$ controls the initial rate of change of inductance by changing the rate of change of magnetic reluctance in the airgap. It is advantageous to have the magnetic insert 237 slightly smaller in transverse dimension (indicated by $\epsilon$) than the primary or tertiary transverse dimension; similarly, it is advantageous to have the magnetic insert 237 slightly smaller (indicated by $\delta$) in its base longitudinal dimension than the primary or tertiary pole piece. The length of the edge $\tau_{ss} - \tau_s$ (termed extension zone) partially determines the amount of leakage flux that is tolerable and the inductance characteristic versus time.

Figure 25:
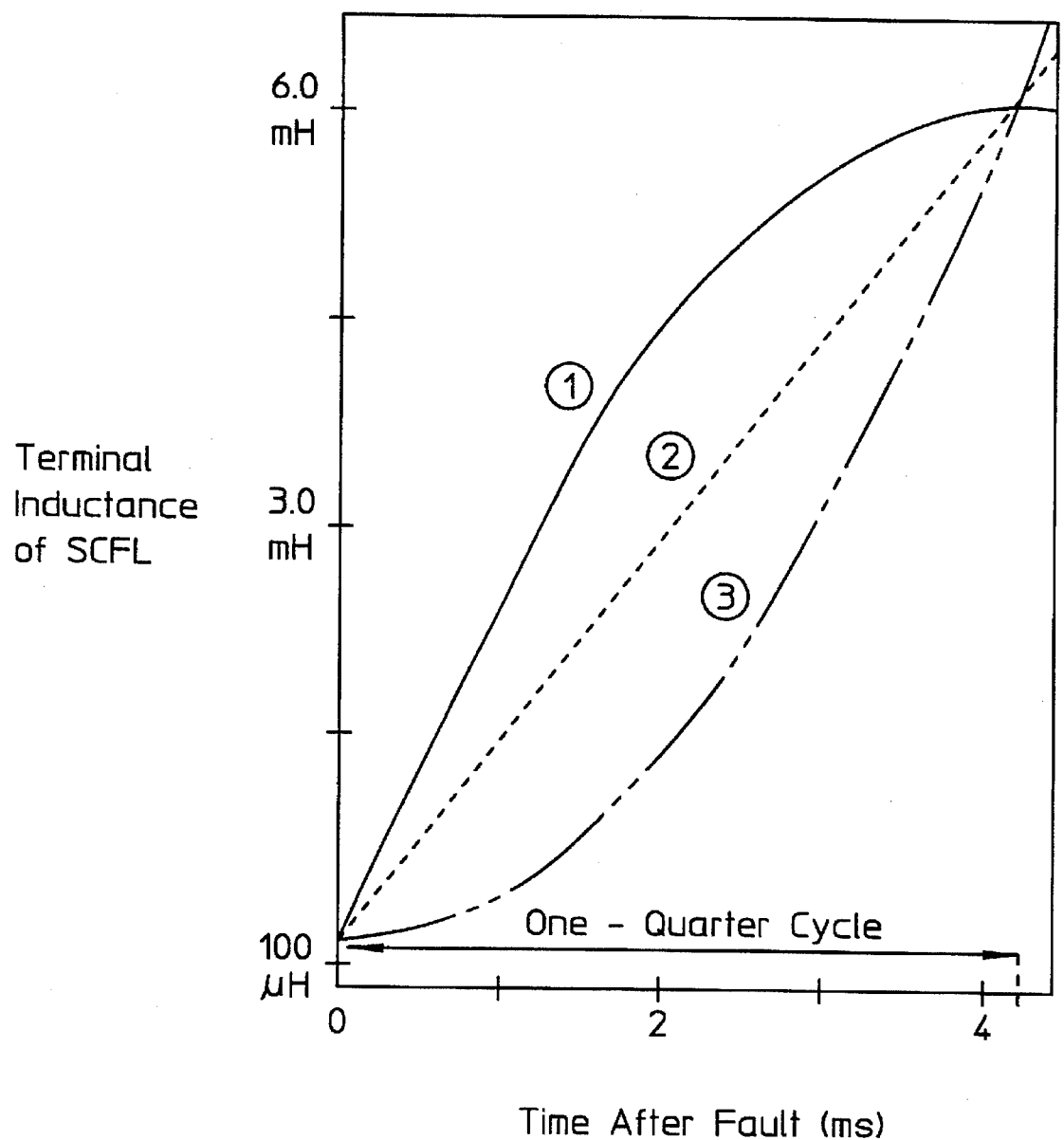
FIG. 25 shows three different response curves for inductance of the primary coil versus time after fault detection.

FIG. 25 shows three different response curves for inductance versus time. Curve A is a quasi-sine-wave curve and is a linear characteristic, and Curve C is a quasi-exponential characteristic. Curve C will have the longest extension zone and smallest angle $\alpha_{22}$ whereas Curve A will have the shortest extension zone and larger angle $\alpha_{22}$ of the set. All three curves show a representative starting inductance of 120–140 μH and a final inductance of 6.0–6.5 mH at 4 milli-seconds after fault detection.

Control System

The control scheme described relates the polyphase electric power systems whereby a linear-type cryogenic or superconducting fault limiter is applied and wherein the tertiary winding is either cryogenic or superconducting, the primary winding may be of the normal conducting or superconducting type without major modifications to the control system. The invention relates to inductive fault limiting whereby a controllable inductance is inserted in series with the power system and the load may be at unity, or lagging power factor over the full range of power factors. For leading power factor loads, there is a restricted range of application of the inductive fault limiter such that the network must remain sufficiently far away from an oscillatory or resonant condition and it is required that the series insertion of a controllable inductance combined with the specific line impedances results in an overdamped R-L-C circuit at the worst case condition.

The apparatus subject of the invention is triggered by four general means indicative of fault conditions:

1. By the line current in any one phase exceeding a pre-determined threshold value for the rms value of the AC component of current, representing primarily symmetrical AC faults.

2. By the total AC+DC component in any one or multiple lines exceeding a pre-determined threshold for the total (AC+DC) current, representing primarily asymmetrical faults.

3. By the value of the measured di/dt or rate of change of current of the line current at or near current zero, as measured on one or greater load lines, exceeding a threshold value for di/dt based on pre-determined limits.

4. A unique combination of the three conditions above, whereby it is common on a power system fault for line A to have a substantially symmetrical fault and for lines B and C to have asymmetrical or high DC-offset faults.

The control system normally monitors the flow of line current in quiescent conditions and establishes a load power factor, which will slowly vary according to user demand. However at the time of a fault occurring, it is not appropriate to characterize by use of power factor; rather, the circuit or network has a particular X/R ratio where X=inductive reactance of load and R=resistance of load. In conventional high-voltage, e.g., 15 kV or 30 kV power systems, a typical X/R ratio may be as high as 17:1, the X/R ratio may change from 15:1 to approximately 3:1 or 5:1 prior to inductance insertion by the described invention.

The control system has 9 major inputs from a 3-phase line as follows:

| | | |
|---|---|---|
| 1. | Phase A line current magnitude | $I_a$ |
| 2. | Phase A line current phase angle | $\theta_a$ |
| 3. | Phase B line current magnitude | $I_b$ |
| 4. | Phase B line current phase angle | $\theta_b$ |
| 5. | Phase C line current magnitude | $I_c$ |
| 6. | Phase C line current phase angle | $\theta_c$ |
| 7. | Phase A DC offset | $I_{o1}$ |
| 8. | Phase B DC offset | $I_{o2}$ |
| 9. | Phase C DC offset | $I_{o3}$ |

The phase angle is referenced from the line to neutral voltage irrespective of whether the load is wye or delta connected. The control system must accommodate an unbalanced polyphase system at all times and therefore it is valid that $$I_a \neq I_b \neq I_c$$

and $$I_{o1} \neq I_{o2} \neq I_{o3}$$

and $$\theta_a \neq \theta_b \neq \theta_c$$

Figure 26:
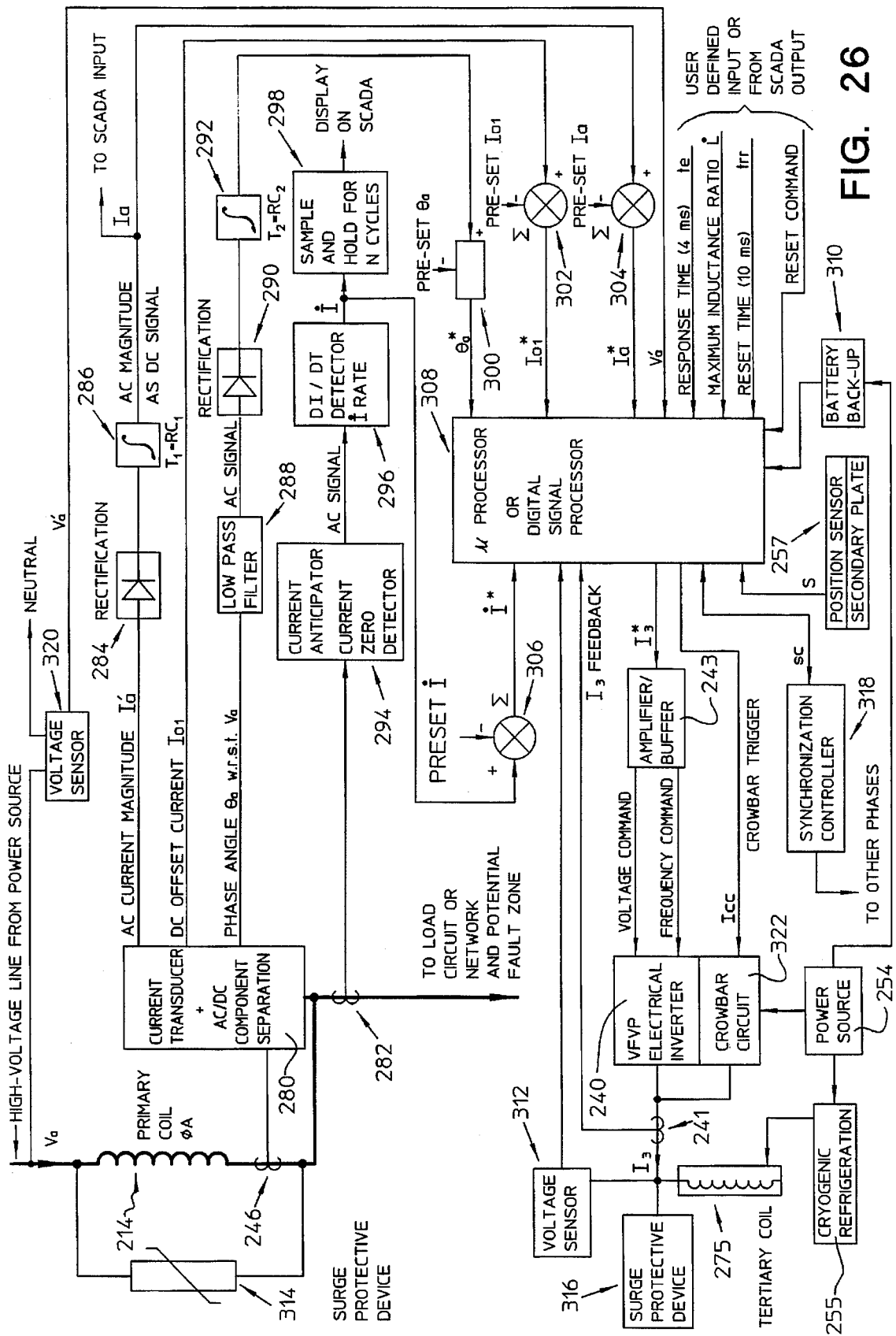
FIG. 26 is an electronic control system for a multiple-phase fault limiter with current detection in close vicinity to the fault limiter.

In the control scheme, each phase has its own integrator, current-zero detector and current anticipator circuitry which provide independent input conditions to each of the variable-frequency, variable-phase power conditioners or inverters driving the tertiary winding. FIG. 26 shows the base control system for a linear-type inductive fault limiter using transverse flux magnetic circuits and a cryogenic or superconducting tertiary winding; by way of example only one phase of three is shown; the other phases are identical in configuration. The system shown in FIG. 26 is not limited to three phase systems but can be applied to other systems of both even and odd number of phases.

TABLE 2

Description of Components Corresponding to FIG. 26 Control System

| | |
|---|---|
| 240 | Variable-frequency variable-phase single-phase electrical inverter with current-controllable output |
| 241 | Current transducer (magnitude, phase, offset) for tertiary winding |
| 243 | Amplifier/buffer from microprocessor to input of inverter 240 |
| 246 | Current transducer for magnitude, phase, and DC-offset for primary winding |
| 254 | Power source for tertiary winding, cryogenics and control electronics |
| 255 | Cryogenic refrigerator/liquefier or compressor |
| 257 | Position sensor for secondary electrical member |
| 274 | Primary coils for Phase A |
| 275 | Tertiary coils for Phase D |
| 280 | Current transducer electronics for AC/DC component separation and filtering |
| 282 | Current transducer for current anticipator and di/dt detector |
| 283 | Power Source |
| 284 | Full-wave rectification of AC component of current $I_a$ |

TABLE 2-continued

Description of Components Corresponding to FIG. 26 Control System

| | |
|---|---|
| 285 | Isolation or impedance-changing Transformer at Power Source |
| 286 | Integrator/low-pass filter for current magnitude with time constant $T_1$ |
| 288 | Low-pass filter for Phase A phase-angle signal |
| 290 | Full-wave rectification of phase angle signal |
| 292 | RC integrator/filter for phase angle (Phase A) rectified signal |
| 294 | Current-anticipator/current zero detector for Phase A |
| 296 | DI/DT detector for Phase A producing DC signal proportional to di/dt |
| 298 | Sample and hold operational amplifier for display of di/dt DC-signal |
| 300 | Non-linear signal limiter: Phase angle signal with pre-set reference |
| 302 | Summation junction: DC offset current with pre-set DC offset threshold |
| 304 | Summation junction: AC-component of current magnitude with pres-set threshold |
| 306 | Summation junction: di/dt dc-signal with pre-set threshold |
| 308 | Central microprocessor and feedback controller to command inverter 240 |
| 310 | Battery or uninterruptible back-up power supply for microprocessor and electronic controls |
| 312 | Voltage sensor and non-linear voltage-sensitive clamp for tertiary winding |
| 314 | Surge protective device across primary coil group 274 |
| 316 | Surge protective device across tertiary coil group 275 |
| 318 | Synchronization controller for coordination with Phase B and C (and other applicable phases) |
| 320 | Voltage sensor or voltage transducer for line to neutral voltage at input to Phase A primary |
| 322 | Electronic crow-bar circuit for selective short-circuiting of tertiary winding |

Description of FIG. 26

The primary coil 274 is monitored by two current transducers 246, 282, which are of the non-saturating type such as optical current transducers. Transducer 246 feeds a digital signal processor (DSP) 280 which filters the current waveform and then determines the true rms AC component of the fundamental, the DC offset of the waveform and the phase angle of the current with respect to the line to neutral voltage measured by voltage transducer 320. The processor 280 also determines the X/R ratio of the load or network both prior to, during and subsequent to the fault conditions. The AC current magnitude output of 280 is rectified by device 284 in a full-wave bridge and subsequently integrated by device 286 with a controllable time constant $T_1$. The output of device 286 is a DC signal which is both sent to a SCADA or display controller and also sent to summation junction (operational amplifier) 304 wherein this signal is summed with a negative pre-set current threshold magnitude. The resulting DC signal output of device 304 is the command signal $I_a^*$ to the central microprocessor 308. Digital signal processor 280 also outputs a DC signal proportional to the DC offset of the line current ($I_{o1}$) which is sent to summation junction 302 (high-gain operational amplifier) wherein the offset signal is summed with a pre-set DC offset threshold (obtained from a potentiometer or SCADA controller) to produce the resultant DC offset command signal $I_{o1}^*$ for input to the central microprocessor 308.

Digital signal processor 280 also outputs an AC signal $\theta_a$ which yields the phase angle of the line current with respect to the line to neutral voltage obtained from voltage transducer 320. This phase angle signal is passed through low-pass filter 288 as an AC signal then rectified by a full-wave bridge rectifier 290 and subsequently integrated by device 292 (operational amplifier) with controllable time-constant $T_2$. This signal is entered into limiter 300 (operational amplifier) which determines if the power factor is negative; positive or beyond limits. If the phase angle is too far positive indicating a leading power factor (capacitive load), a clamp network is placed on phase angle command signal $\theta_a^*$, the output of device 300. If the phase angle is negative (from 0° through −90°), then there is no clamping action. The limiter 300 has pre-set values for threshold control.

Current transducer 282 measures the phase current and feeds current anticipator/current-zero detector 294. The current anticipator may be constructed with a magnetic loop on a toroidal-core transformer which produces a phase shift such that a current zero precedes the actual current zero of the line current. This allows the di/dt or rate of change of current at current zero to be determined with operational amplifier 296 determining the slope of the line current and converting this to a DC output signal I. This scheme assumes that the maximum rate of change of current occurs at current zero in the case of a symmetrical waveform. For asymmetrical waveforms the microprocessor 308 accounts for the shift in the location of the maximum di/dt due to DC offset. Device 298 is a sample-and-hold amplifier which holds I signals from the last 10 cycles and sends these to an external display or SCADA controller for monitoring purposes. The I signal is sent to summation junction 306 (operational amplifier) which is added to a pre-set negative I reference signal to produce a resultant signal I* for input to the central microprocessor.

There are four mandatory inputs from the master station of SCADA controller which determine user selectable conditions:

1. Trigger response time, $t_c$: This is the number of milliseconds from detection of fault condition (by either di/dt threshold or absolute current) to the condition when 95% of the maximum inductance is inserted; this number is typically 4.2 milliseconds or ¼-cycle of a 60 Hz waveform.

2. Maximum inductance ratio, L: This the ratio of $L_{t=t_c}$:$L_{t=o}$ where t=o is the initiation of the triggering action. This parameter also establishes the extent of longitudinal movement of the secondary electrical member; for lower than nominal ratios, the movement is restricted to a distance less than $\tau_p$ as shown in FIG. 24D. Due to breaker coordination relaying schemes, there are control scenarios whereby it is not necessarily desirable to yield maximum inductance as permitted by the magnetics design, consequently the final or highest inductance ratio produced is programmed to be less than the rated maximum inductance ratio.

3. Reset time, $t_{rr}$: This is the minimum time the fault limiter can recover from maximum inductance position to the initial (quiescent) position and requires reverse electromechanical movement of the secondary electrical member. This is accomplished by reverse-phasing of the tertiary winding once the fault is cleared by the power system operator or operation of a series interrupting breaker. A typical value of reset time is 10–15 milliseconds. Setting the value of $t_{rr}$ instructs the microprocessor 308 to command reverse current at a certain inverter controllable rate.

4. Reset command: This is a digital command signal that instructs the central microprocessor 308 precisely when to initiate the reverse phase sequence excitation of the tertiary winding to retract the secondary electrical member and change inductance from high-state to low-state. This command is most typically derived from an external control station or the SCADA controller and is not a locally generated signal except for the occurrence of optional automatic resetting, for example, a reset command signal being initiated every 300 milliseconds after a fault-limiting operation.

A position sensor 257 monitors the longitudinal location of the secondary electrical member on a continuous basis and provides a digital signal input to the central microprocessor 308, which in turn calculates the pole angle of the secondary electrical member. This permits device 308 to have an approximate indication of the change in airgap reluctance based strictly on physical measurement of position rather than taking electrical measurements. The main purpose of device 257 is to verify that the secondary electrical member is lined up in the direct-axis, quadrature-axis or at an intermediate position with respect to the primary magnetic cores.

Microprocessor 308 receives a fast response, unfiltered voltage feedback signal derived from voltage sensor 312 connected to the two terminals of tertiary coil 275, this feedback occurring individually for all phases in a polyphase system. This feedback signal is necessary to monitor since it is desirable for the control scheme to maintain the tertiary voltage induced by rapid current change on the primary at the lowest practical level. In the non-fault state, the tertiary voltage will be approximately zero and conversely will attain a maximum value when the rate of change of the flux linkages:

$\psi = L \cdot i_1$ is at its maximum, i.e., $$V_{tertiary} = k_1 \cdot d\psi/dt$$
$$= k_1[L \cdot di/dt + I \cdot dL/dt]$$

where constant $k_1$ is dependent on the turns ratio between primary and secondary and the coupling factor.

In a typical application for a high-voltage power system, we may have $L$=600 µH $di/dt$=10,000 A/ms or $10^7$ A/s $I$=15,000 Amps rms $dL/dt$=600 µH/4.0 ms=0.150 H/s Therefore, the rate of change of flux linkages is $$d\psi/dt = 600\,H-A/s + 2{,}250\,H-A/s$$
$$= 2{,}850\,H-A/s$$

This indicates that the I.dL/dt term is significantly larger in the practical fault limiter application than the L.di/dt term for medium level faults such as 15,000 Amps maximum.

For larger faults such as 60,000 Amp level, then the term I.dL/dt becomes 9,000 H-A/s and the change in flux linkages becomes $$d\psi/dt = 9{,}000 + 2{,}250 = 11{,}250\,H-A/s$$
$$= 11.25\,kV$$

generated on the primary. In a practical system, the tertiary to primary turns ratio will be a minimum of $N_3/N_1$=4:1 and the coupling factor may be typically $K_c$=93%; therefore, the constant $K_1=(K_c)*(N_3/N_1)$. This indicates for a high-level fault such as 60,000 Amps, the induced voltage in the tertiary will be $$4*K_c*(11.25 \text{ kV})=K_c*45 \text{ kV}$$

from line to line or $K_c*22.5$ kV line to ground in the mid-point grounded arrangement as shown in FIG. 21.

The same turns ratio establishes the approximate level of tertiary MMF (tertiary current) when tracking the MMF of the primary during the non-fault stage. For example, if the fault limiter is a 1200 Amps continuously rated device, the tertiary winding would provide equal and opposite ampere-turns to the primary in this mode and with $N_3/N_1=4$, the variable-frequency, variable-phase inverter 240 would provide 1200/4=300 Amps rms to tertiary. When the current exceeds the maximum continuous current and a fault current identified, it is no longer a requirement of the inverter 240 to provide matching or bucking MMF to the tertiary winding. The tertiary will exhibit high-voltage at no-current when in the fault mode; in one operational mode it is advantageous to short-circuit the tertiary through crow-bar circuit, 322 connected in parallel with output of inverter 240.

The effect of short-circuiting the tertiary winding due to a high primary fault is to increase the effective airgap and to consequently increase the overall reluctance of the primary winding resulting in larger inductive reactance for the fault limiter when in a non-fault "steady-state" condition. The microprocessor 308 controls the inverter 240 through buffer/amplifier 243 with the phase angle and magnitude at the current command signal $I_3^*$ tailored to match (in 180° phase reversal) the current versus time waveform of the primary. Inverter 240 is a high-response, variable-phase DC-link inverter with a slew rate on the order of 20 times faster than the maximum slope of current versus time for a 60 Hz waveform crossing the abscissa.

The inverter output current is monitored by current transducer 242 which provides a feedback signal to microprocessor 308. Tertiary winding 275 is fitted with a surge protective device 316 which serves to protect said winding against fast-rising or transient overvoltages. Device 316 may take the form of a zinc-oxide surge arrestor with a non-linear breakdown characteristic.

Power source 254 has 3 principal functions:
1. Provide DC low power for the central microprocessor 308 through a battery back-up device 310 for uninterruptible power.
2. Provide DC high-power low-voltage to the inverter 240 for powering of the tertiary winding during pre-fault or post-fault conditions when this tertiary MMF must be matched to buck the primary MMF.
3. Provide AC high-power, medium voltage to the cryogenic refrigeration system, 255, which in turn cools the cryostat or tertiary winding to a cryogenic temperature such as 77° K. or to a colder superconducting temperature such as 4° K. OR 20° K.

Figure 27:
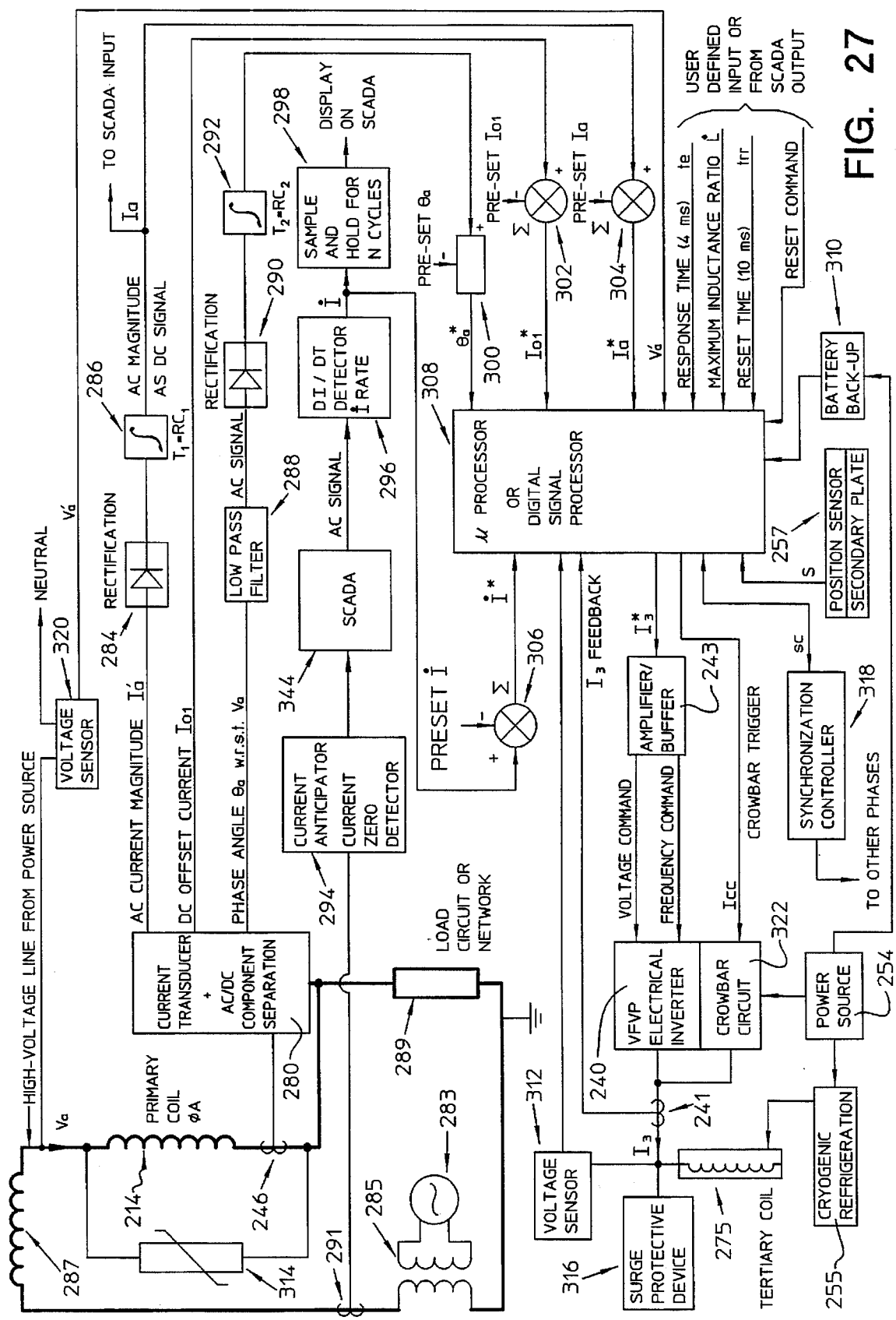
FIG. 27 is an electronic control system for a multiple-phase fault limiter with remote current detection and SCADA control of the triggering signals and major control parameters.

FIG. 27 shows a master control system which includes means to set a predetermined threshold limits for current magnitude or rate of change of primary current by a remote current detector 291 or remote current anticipator 295 wherein threshold information is transmitted to the fault limiter DI/DT detector 296 through a supervisory control and data acquisition (SCADA) system 344, through a radio frequency communication, through an optical link or through a carrier line-frequency communication system from either a central dispatch station or a remotely located monitoring site. The electricity source 283 is shown to feed transformer 285 which is connected to a transmission line represented by a lumped reactance 287 which is in series with the fault limiter primary coil 214 and load circuit 289.

FIG. 27 shows an apparatus to measure the differential in MMF between tertiary 275 and primary 214 coil. This signal 340 is regulated by the variable-phase, variable frequency power supply 322 to produce a force acting on the secondary plate 225 (Ref. FIG. 19A, 19B) with variable force characteristic versus time. This consequently produces a multiple-slope or variable inductance versus time characteristic, as shown in FIG. 25, for the primary coil 214 whereby the multiple-slope or variation of inductance is an adjustable characteristic under active control of the microprocessor/digital signal processor 308, as shown in FIG. 27.

FIG. 27 shows an independent power supply which may take the form of a variable-phase variable frequency electrical inverter 240 feeding a tertiary coil 275 which has electronic surge protective device 316 on the output or a surge protective device 317 on the input terminals for the purpose of limiting the magnitude of transient overvoltages applied to the tertiary coils and the internal circuitry of the independent power supply. The power supply 240 has the ability to supply four-quadrant power to the tertiary coil 275 with bi-laterial current output and being able to energize tertiary coils 275 which operate at a lagging or leading power factor or have an outward power flow by virtue of the magnetic coupling to the primary.

FIG. 27 shows an apparatus wherein the independent power supply 240 for each phase feeding independent sets of tertiary coils 275 are synchronized by the action of the central micro-processor or controller 308 responsive to external input commands consisting of: a) operating response time, b) maximum inductance ratio, c) reset time and d) a reset command for which electrical cycle subsequent to a fault to commence retraction of the secondary plate 225 (Ref. FIG. 19A). This provides a means to ensure that all tertiary coils in a polyphase system are uniformly energized to form a traveling magnetic field with a minimum of phase unbalance among tertiary coils.

The prototype double-sided current fault limiter was constructed with the following characteristics:
Number of Phases: 3 on each side
Winding Type: Transverse Flux, Double Layer, Lap Wound
Number of Magnetic Poles: 2 per side
Overall Length: 939 mm
System Voltage: 480 Volts rms
Airgap per side: 3 mm
Magnetic Core Data
Number of Magnetic Cores: 14
Longitudinal Pitch of Magnetic Cores: 136 mm
Transverse Width of Magnetic Cores: 108 mm
Longitudinal Magnetic Core Dimension: 64 mm
Overall Depth of Magnetic Core: 83 mm
Inside Depth of Magnetic Core: 58 mm
Magnetic Material: Laminated Supermendur
Electrical Coil Data
Total Number of Coils: 32
Overall Coil Length: 255 mm
Overall Coil Transverse Width: 68 mm
Overall Coil Height: 29 mm
Inside Window Dimension: 214 mm×28 mm
Conductor Cross section: 4.5 mm×2.5 mm
Number of Turns: 30

Number of conductor layers: 5

Number of transverse conductor rows: 6

Conductor Material: High Purity, High Conductivity Aluminum

Coil inductance in air: 142 micro-Henries

Insulation Dielectric Strength: 2500 Volts

Reaction Rail

Substrate Overall Width: 153 mm

Substrate Overall Length: 775 mm

Number of Magnetic Inserts: 6

Magnetic Insert Transverse Width: 106 mm

Magnetic Insert Longitudinal Dimension: 50 mm

Longitudinal pitch of Magnetic Inserts: 136 mm

Magnetic Insert Thickness: 12.2 mm

Magnetic Insert Material: Ferromagnetic Steel

Substrate material: High Conductivity Aluminum

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An electrical current fault limiter comprising:

a primary excitation member;

a secondary electrical member disposed adjacent the primary excitation member, said secondary electrical member movable relative to said primary excitation member;

a tertiary excitation member disposed adjacent the secondary electrical member, said secondary electrical member movable relative to said tertiary excitation member, said secondary electrical member disposed between the primary and tertiary excitation member such that the primary and tertiary excitation members and secondary electrical member comprise a transverse flux magnetic circuit when the primary electrical member is connected in series with an electrical circuit to be current limited, said primary and tertiary excitation members forming a linear array and said secondary electrical member causing a change in magnetic reluctance in flux linking the primary and tertiary excitation members when the secondary electrical member moves subsequent to altering the effective external line impedance of the primary excitation member, said secondary electrical member moving by induction-electrodynamic repulsion current action due to a net driving MMF corresponding to MMF produced by the primary excitation member and MMF produced by the tertiary electrical member when the primary excitation member is connected to the external circuit wherein current is to be limited, and the tertiary electrical member is connected to an independent controllable power supply or to another external circuit.

2. A fault limiter as described in claim 1 wherein the primary excitation member comprises a plurality of primary magnetic cores, a plurality of primary conductive coils linking the plurality of magnetic cores arranged to form a traveling wave or polyphase excitation system, and a primary structure in which the plurality of primary magnetic cores and polyphase windings are disposed; and wherein the tertiary excitation member comprises a plurality of tertiary magnetic cores, a plurality of tertiary conductive coils linking the plurality of tertiary magnetic cores arranged to form a traveling wave or polyphase excitation system, and a tertiary structure in which the tertiary magnetic cores and windings are disposed.

3. A fault limiter as described in claim 2 wherein the secondary electrical member comprises an electrically conductive plate structure having repeatable magnetic zones and non-magnetic zones arranged in tandem along the direction of movement of the plate structure.

4. A fault limiter as described in claim 3 including a primary airgap between the primary structure and the plate structure, and a tertiary airgap between the tertiary structure and the plate structure, said airgaps permeable to magnetic flux.

5. A fault limiter as described in claim 4 wherein the net driving MMF causes the plate structure to move in a traveling wave with a slip mode having a traveling speed $V_r$ where $$V_r = 2\tau f(1-\sigma)$$

and where f=line frequency (Hz)

$\tau$=pole—pitch of primary (m)

$$\sigma = \text{slip} = \frac{V_s - V_r}{V_s} \text{ and}$$

$V_s$=synchronous velocity (m/s).

6. A fault limiter as described in claim 5 wherein the primary excitation member includes a cooling mechanism having a cooling vessel disposed in the primary structure, said primary cores and primary coils disposed in the cooling vessel for cryogenically cooling the primary magnetic cores and coils to minimize internal power dissipation.

7. A fault limiter as described in claim 6 wherein each primary conductive coil is composed of alternating current superconducting tape or wire capable of operation in an AC magnetic field with AC excitation at a desired line frequency.

8. A fault limiter as described in claim 6 wherein the secondary electrical member comprises ferro-magnetic inserts which define the magnetic zones, said inserts spaced at intervals of one core pitch of individual magnetic cores in the primary or tertiary structure.

9. A fault limiter as described in claim 8 wherein the secondary electrical member includes left side and right side stationary shock dampers, and at least one mechanical coil spring mounted on each end of the plate structure and respectively connected to the left side and right side stationary shock damper, which provide a controllable deceleration rate for the plate structure and provide means for regulation of the rate of change of self-inductance of the primary conductive coils.

10. A fault limiter as described in claim 9 including position sensors which sense horizontal position and horizontal acceleration of the plate structure wherein a feedback signal is provided from the sensors to the control system for the independent controllable power supply feeding the tertiary excitation member, and the independent power supply has the capability of providing negative sequence current to the tertiary coil so as to reverse the direction of movement of the secondary plate in order to retract, said plate subsequent to a fault condition or to modulate the net acceleration of the plate in order to adjust the inductance versus time characteristic of the primary coil.

11. A fault limiter as described in claim 10 wherein the ferro-magnetic inserts of the plate structure align with the primary and tertiary magnetic cores in the primary and tertiary structure, respectively, when the fault limiter operates in the high-inductance mode or post-fault condition.

12. A fault limiter as described in claim 11 wherein the tertiary excitation member includes a tertiary cooling mechanism having a tertiary cooling vessel disposed in the tertiary structure, said tertiary cores and tertiary coils disposed in the tertiary cooling vessel for cryogenically cooling the tertiary magnetic cores and coils, thereby minimizing the internal power dissipation in the tertiary coils.

13. A method for limiting electrical faults comprising the steps of:

monitoring primary current in a primary coil;

determining magnitude of an AC component and a DC component of the primary current and phase angle of the primary current with respect to voltage;

providing a variable phase variable frequency tertiary current to a tertiary coil, said frequency of the tertiary current equal to the line frequency of the primary current; and regulating phase angle of a tertiary coil current produced by a tertiary coil power supply for the tertiary current to be different than the phase angle of the primary current depending on a threshold level at which a secondary plate, located between the primary and tertiary coil commences movement due to airgap magnetic flux between the primary and tertiary coils and induced currents in the secondary plate which results from the combined primary magnetomotive force and tertiary magnetomotive force, respectively.

14. A method as described in claim 13 including before the step of providing a variable phase variable frequency tertiary current, there is the step of controlling the tertiary current such that the MMF of the tertiary current is equal to or less than or greater than the MMF of the primary current depending on a desired rate of change of terminal inductance of the primary coil.

15. A method as described in claim 14 wherein the controlling step includes the step of controlling the tertiary MMF such that when the primary current for all phases in a polyphase system is below a threshold level for a fault, the tertiary MMF is equal and opposite to the MMF of the primary coil so movement of the secondary plate is precluded and the primary structure exhibits minimum inductance characteristic.

16. A method as described in claim 14 wherein the controlling step includes the step of regulating the tertiary MMF such that when the primary current in any one phase is determined to be above a threshold state, then the tertiary power supply excites the tertiary coil with an MMF in phase with the MMF of the primary coil and significantly higher than the MMF of the primary coil in magnitude thereby causing movement of the secondary plate and consequent decrease in reluctance of the primary coil and consequently the primary coil exhibits a maximum inductance characteristic.

17. A method as described in claim 14 wherein the controlling step includes the step of regulating the tertiary MMF such that if the rate of change of primary current at or about current-zero in any phase of a polyphase system is below a threshold level for a fault, the tertiary MMF is equal and opposite to the MMF of the primary coil which precludes movement of the secondary plate and the primary structure exhibits minimum inductance characteristic when connected in series with an external power system.

18. A method as described in claim 14 wherein the controlling step includes a step of regulating the tertiary MMF such that if the rate of change of primary current at or about current-zero condition in any phase of a polyphase system is at or above a predetermined threshold level for a fault, then the tertiary coil power supply excites the tertiary winding with an MMF in phase with the MMF of the primary winding and significantly higher than the primary MMF in magnitude thereby causing an acceleration of the secondary plate and consequent decrease in the magnetic reluctance of the magnetic flux linking the primary winding and consequently the primary winding exhibits a maximum inductance characteristic.

19. A method as described in claim 13 including before the providing step, there is a step of measuring a negative sequence component of the primary current and regulation of the MMF produced by the tertiary coil responsive to the magnitude of negative sequence current such that if the magnitude or rate of change of primary negative sequence current exceeds predetermined threshold levels, the independent controllable power supply will produce a positive sequence current output sufficiently large to produce a tertiary MMF capable of rapid and sustained forward acceleration of the secondary plate and consequent decrease in magnetic reluctance of the primary coil in the presence of a primary MMF which produces a component of force in a reverse direction or a zero-sequence magnetic field.

20. A method as described in claim 13 including before the providing step, there is a step for measurement of zero-sequence component of the primary current and regulation of the MMF produced by the tertiary coil response to the magnitude of zero sequence current such that if its magnitude or rate of change of the total primary current exceeds predetermined threshold levels, the independent controllable power supply will output a positive sequence current sufficiently large to produce a tertiary MMF capable of producing rapid and sustained forward acceleration of the secondary plate and consequent decrease in the magnetic reluctance of the primary winding despite the presence of a primary MMF which produces a zero-sequence magnetic field or a component of force in a reverse direction.

21. A method as described in claim 18 wherein the predetermined threshold limits for current magnitude or rate of change of primary current are established by a remote current detector or remote current anticipator wherein threshold information is transmitted to the fault limiter through a supervisory control and data acquisition (SCADA) system, through a radio frequency communication, through an optical link or through a carrier line-frequency communication system from either a central dispatch station or a remotely located monitoring site.

22. A method as described in claim 14 wherein the regulating step includes a step of regulating the differential in MMF between tertiary and primary windings to produce a force acting on the secondary plate with variable force characteristic versus time which consequently produces a multiple-slope or variable inductance versus time characteristic for the primary winding whereby the multiple-slope or variation of inductance is an adjustable characteristic under active control.

23. A method as described in claim 14 wherein the providing step includes the step of providing variable-phase variable-frequency tertiary current to form a system of bi-lateral or regenerative power flow between the tertiary coil and an input power source feeding the independent power supply feeding said tertiary coils.

24. A fault limiter as described in claim 12 wherein the independent power supply feeding the tertiary coil has an electronic surge protective device on either the power supply's input or output terminals for the purpose of limiting the magnitude of transient overvoltages applied to the tertiary coil and the independent power supply, said independent power supply supplying four-quadrant power to the tertiary coil with bi-lateral current output and being able to energize the tertiary coil which operates at a lagging or leading power factor.

25. A fault limiter as described in claim 12 including semiconductor devices which comprise the independent power supply and whereby the independent power supply is cryogenically cooled by coolant fluid of the same tertiary cooling mechanism as the coolant fluid flows through the tertiary coil providing cryogenic coolant to the semiconductor devices to minimize internal power dissipation and physical volume of the independent power supply.

26. A fault limiter as described in claim 25 including a grounded cooling vessel wherein the tertiary coil is wound with a center-tapped coil or terminal of a coil on one or greater phases which is grounded or connected to an external power system neutral potential allowing the tertiary coil to operate in close proximity to the grounded cooling vessel or within the coolant fluid which is connected to ground potential thereby permitting low dielectric stresses within the cooling vessel.

27. A fault limiter as described in claim 26 including independent sets of tertiary coils and wherein the independent power supply includes independent power supplies on each phase feeding the independent sets of tertiary coils and which are synchronized by the action of the central microprocessor or controller responsive to external input commands consisting of: a) operating response time, b) maximum inductance ratio, c) reset time and d) a reset command for which cycle subsequent to a fault to commence retraction of the secondary plate to ensure that all tertiary coils in a polyphase system are energized to form a traveling magnetic field with a minimum of phase unbalance among tertiary coils.

* * * * *